US009406419B2

(12) United States Patent
Njiende T. et al.

(10) Patent No.: US 9,406,419 B2
(45) Date of Patent: Aug. 2, 2016

(54) INTEGRATED MAGNETIC COMPONENT

(75) Inventors: Hugues Douglas Njiende T., Paderborn (DE); Roland Robrecht, Grevenbroich (DE); Jochen Mielke, Bielefeld (DE)

(73) Assignee: DET INTERNATIONAL HOLDING LIMITED, George Town Grand Cayman (KY)

( * ) Notice: Subject to any disclaimer, the term of this patent is extended or adjusted under 35 U.S.C. 154(b) by 465 days.

(21) Appl. No.: 12/883,715

(22) Filed: Sep. 16, 2010

(65) Prior Publication Data
US 2011/0063065 A1 Mar. 17, 2011

(30) Foreign Application Priority Data
Sep. 17, 2009 (EP) ..................................... 09405158

(51) Int. Cl.
*H01F 27/24* (2006.01)
*H01F 27/28* (2006.01)
(Continued)

(52) U.S. Cl.
CPC .................. *H01F 3/10* (2013.01); *H01F 27/38* (2013.01); *H01F 27/40* (2013.01); *H01F 30/10* (2013.01);
(Continued)

(58) Field of Classification Search
USPC ................. 336/170, 178, 192, 200, 212, 221
See application file for complete search history.

(56) References Cited

U.S. PATENT DOCUMENTS 1,654,097 A * 12/1927 Shackelton ................... 323/302
3,716,719 A *  2/1973 Angelery et al. .............. 307/17
(Continued)

FOREIGN PATENT DOCUMENTS

CN 2208738 Y 9/1995
CN 1881771 A 12/2006
(Continued)

OTHER PUBLICATIONS

Sun et al., "An Improved Current-Doubler Rectifier with Intergrated Magnetics", APEC 2002. 17th Annual IEEE Applied Power Electronics Conference and Exposition., XP010583014, vol. 2, Mar. 10, 2002, pp. 831-837.
(Continued)

*Primary Examiner* — Tsz Chan
(74) *Attorney, Agent, or Firm* — Birch, Stewart, Kolasch & Birch, LLP

(57) ABSTRACT

A magnetic component, with a first and a second U/UR core ($U_1$, $U_2$) assembled to a first O-shaped core assembly, wherein an U/UR core has—according to its shape—a first post and a second post with free ends on one side and a leg connecting the first post and the second post on their other side, wherein the first and the second U/UR core ($U_1$, $U_2$) are assembled with their free ends abutting each other to form the first O-shaped core assembly. The free ends of a third U/UR core ($U_3$) are abutting the outside of the first O-shaped core assembly on one side and that the free ends of a fourth U/UR core ($U_4$) are abutting the outside of the first O-shaped core assembly on an opposite side. In another embodiment, the leg of a third U/UR core ($U_3$) is abutting the outside of the first O-shaped core assembly, wherein the ends of a fourth U/UR core ($U_4$) are abutting the ends of the third U/UR core ($U_3$). In a further embodiment, the ends of a third U/UR core ($U_3$) are abutting the outside of the first O-shaped core assembly. At least one winding is wound directly on the first, the second, the third, and/or the fourth U/UR core ($U_1$, $U_2$, $U_3$, $U_4$). The core structure can either be fully composed of high permeability low saturation cores with air gaps or be composite comprising low permeability high saturation cores and high permeability low saturation cores with no air gaps.

25 Claims, 26 Drawing Sheets

(51) Int. Cl.

| | |
|---|---|
| *H01F 17/06* | (2006.01) |
| *H01F 27/29* | (2006.01) |
| *H01F 5/00* | (2006.01) |
| *H01F 17/04* | (2006.01) |
| *H01F 3/10* | (2006.01) |
| *H01F 27/38* | (2006.01) |
| *H01F 27/40* | (2006.01) |
| *H01F 30/10* | (2006.01) |
| *H01F 41/02* | (2006.01) |
| *H01F 3/14* | (2006.01) |
| *H01F 27/30* | (2006.01) |
| *H02M 3/28* | (2006.01) |

(52) U.S. Cl.
CPC ...... *H01F 41/02* (2013.01); *H01F 3/14* (2013.01); *H01F 27/306* (2013.01); *H02M 3/28* (2013.01); *Y10T 29/49071* (2015.01)

(56) References Cited

U.S. PATENT DOCUMENTS

| | | | |
|---|---|---|---|
| 4,257,087 A | | 3/1981 | Cuk |
| 4,930,059 A | * | 5/1990 | Rutt ........................... 363/20 |
| 5,378,966 A | * | 1/1995 | Marszalik .................. 315/411 |
| 6,163,466 A | | 12/2000 | Davila, Jr. et al. |
| 6,549,436 B1 | | 4/2003 | Sun |
| 6,784,644 B2 | | 8/2004 | Xu et al. |
| 6,980,077 B1 | | 12/2005 | Chandrasekaran et al. |
| 7,034,647 B2 | | 4/2006 | Yan et al. |
| 2005/0258926 A1 | * | 11/2005 | Weger ........................ 336/212 |
| 2006/0285367 A1 | | 12/2006 | Yasumura |
| 2008/0068120 A1 | * | 3/2008 | Pilniak et al. ............. 336/212 |
| 2008/0150665 A1 | | 6/2008 | Li et al. |
| 2008/0224809 A1 | | 9/2008 | Zhang et al. |
| 2008/0224812 A1 | | 9/2008 | Chandrasekaran |
| 2009/0046486 A1 | * | 2/2009 | Lu et al. ....................... 363/45 |
| 2009/0179723 A1 | * | 7/2009 | Ikriannikov et al. ....... 336/200 |
| 2009/0185398 A1 | * | 7/2009 | Cuk ........................... 363/21.1 |
| 2010/0013587 A1 | * | 1/2010 | Yan et al. ................... 336/192 |

FOREIGN PATENT DOCUMENTS

| | | |
|---|---|---|
| EP | 0 265 938 B1 | 3/1994 |
| EP | 1 732 198 A2 | 12/2006 |
| EP | 1 895 549 A1 | 3/2008 |
| WO | WO 2005008692 A2 * | 1/2005 |

OTHER PUBLICATIONS

Xu et al., "Design of High-Input Voltage Regulator Modules With a Novel Intergrated Magnetics", APEC 2001. 16th Annual IEEE Applied Power Electronics Conference and Exposition, XP010536005, vol. 1, Mar. 4, 2001, pp. 262-267.

Chinese Office Action dated Jan. 6, 2014 for Chinese Application No. 201010535049.9.

Chinese Office Action dated Nov. 15, 2014 for corresponding Application No. 201010535049.9 with an English translation.

* cited by examiner

INTEGRATED MAGNETIC COMPONENT

TECHNICAL FIELD

The invention relates to a magnetic component. The invention relates particularly to an integrated magnetic component for switched mode power converters and specifically to DC/DC power converters.

BACKGROUND ART

Switched mode power supplies as main part of telecom and commercial systems often dictate their size and electrical performance as well as reliability and costs. As requirements for the key characteristics power density and efficiency of power converters increase, the demands of these evaluation characteristics increase for inductive components particularly. One approach of increasing the power density and the efficiency is to integrate the inductive components. Transformers and inductors can be integrated into a single magnetic structure, which reduces costs, increases power density and power efficiency.

A circuit where integrated magnetics is strongly recommended is the current-doubler rectifier (FIG. 1), which can be used with different double-ended primary topologies such as forward, two transistors-forward, push-pull, half bridge or full bridge converters. The current-doubler rectifier circuit, habitually applied for low voltage and high current outputs, uses one simple two-winding transformer and two output inductors. The current-doubler rectifier then exhibits lower conduction losses than the conventional centre tapped rectifier. This configuration results, additionally to the number of discrete magnetic components which yield higher size and costs, in three high current windings and several high interconnection losses which negatively impact the efficiency.

A further circuit where integrated magnetics are strongly recommended is the LLC resonant converter (FIG. 15b), which is capable of yielding high efficiency while operating at high switching frequency. The LLC resonant converter uses three magnetic components: a series resonant inductor, a parallel resonant inductor and depending on the chosen rectifier circuit a two- or three-winding transformer. This converter results, additionally to the number of discrete magnetic components which yield higher size and costs, in at least three windings and several interconnections which negatively impact the efficiency. The parallel resonant inductor and the transformer are generally integrated into one component. An air gap is ground in the non ideal transformer in order to adjust the magnetizing inductance which replaces the parallel resonant inductance.

In U.S. Pat. No. 6,784,644 (Xu et al.), an integrated magnetic structure was introduced, where the transformer secondary winding and secondary inductor windings were integrated, resulting in the removing of the secondary transformer winding with the functionality of the rectifier being guaranteed. Due to introduction of air gap, the secondary windings not just transform but also store energy. The cores-together with the windings-integration cause the cost to be reduced and power density to be increased. The reduction of the number of secondary windings and high current interconnections result in lower winding losses. The tight coupling of primary and secondary windings yields minimized leakage inductance.

The integrated magnetic structures shown in U.S. Pat. No. 6,549,436 (Sun), U.S. Pat. No. 6,163,466 (Davila, Jr. et al.), and U.S. Pat. No. 7,034,647 (Yan et al.) comprise four windings: a primary winding, two secondary windings and an additional filter winding which is introduced to further increase the effective inductance and reduce the current ripple in the output of the current-doubler rectifier circuit.

In EP 1 895 549 (DET International Holding Limited), an inductive element with at least two core parts and at least one winding of an electrical conductor is disclosed. The core parts have elongated centre pieces with a lateral contact surface at their ends. The winding is wound directly on the core-parts without a bobbin or the-like. For manufacturing, the core-parts are arranged co-axially. After the windings have been applied, the core-parts can be arranged in a stack-like arrangement in order to form an inductive element.

In the recent years some efforts were done to integrate all three magnetic components into a single component. Some integrated magnetic structures are shown in "Integrated Magnetic for LLC Resonant Converter", B. Yang, R. Chen, and F. C. Lee, APEC 2001, in "Design of Planar Integrated Passive Module for Zero-Voltage", R. Chen, J. T. Strydom, and J. D. van Wyk, IAS 2001, and in US20080224809. An additional inductor winding is introduced to enhance the leakage inductance of the transformer, which replaces the series resonant inductance.

While the described patents address some proposed ameliorations, there are still some setbacks. Mostly E cores from retail or sometimes complicated core structures as in U.S. Pat. No. 6,980,077 are used. These cores are not flexible in term of mounting and of adjusting the magnetizing inductance and filtering inductance through air gap. Generally a single air gap is manufactured on the centre leg by machine and bobbins are unavoidable to wind the coils. The single air gap, the bobbin and the inflexible assembly negatively affect the costs, the power density, the power efficiency and the thermal distribution. There are supplementary power losses due to air gap fringing fields and higher winding mean length. The bobbins and single air gap are costly and cause more leakage and inductance losses. Additionally the bobbins reduce the power density and increase the thermal resistance.

SUMMARY OF THE INVENTION

It is the object of the invention to create a magnetic component pertaining to the technical field initially mentioned that reduces costs and improves efficiency.

According to the invention, the magnetic component comprises:
a) a first and a second U/UR core assembled to a first O-shaped core assembly, wherein an U/UR core has—according to its shape—a first post and a second post with free ends on one side and a leg connecting the first post and the second post on their other side, wherein the first and the second U/UR core are assembled with their free ends abutting each other to form the first O-shaped core assembly,
b) a third U/UR core which is abutting an outside of the first O-shaped core assembly, and
c) at least one winding wound directly on the first, the second, and/or the third U/UR core.

U/UR cores are used as building blocks for the magnetic component, where the letter U relates to the shape of the core and the letter R illustrates that the core has a round shape. Assembly of the magnetic component is therefore more flexible and also simplified. The U/UR cores together with the windings wound on the U/UR core can be prepared as standardized building blocks. Standardized U/UR cores can be manufactured in high quantities, and therefore manufactured with reduced costs per piece. When abutting the U/UR cores, closed paths for magnetic flux are established. After the U/UR cores have been assembled, windings like a first and a second primary winding can be easily connected and functionality of the magnetic component can be easily provided.

Generally any number of the above mentioned building blocks may be assembled in any possible way in order to achieve a desired functionality of the magnetic component. The U/UR cores are abutting or adjoining each other in the sense that specific parts of the surface of the U/UR cores are touching each other. However, as will be described later on, air gaps or any other material may be arranged between the U/UR cores, especially in order to adjust magnetic properties of the magnetic component.

In a preferred embodiment of the magnetic component, the free ends of the third U/UR core are abutting the outside of the first O-shaped core assembly on one side and the free ends of a fourth U/UR core are abutting the outside of the first O-shaped core assembly on an opposite side. Such a magnetic component comprising four U/UR cores is providing a basis for a current doubler rectifier, as will be described in more detail later.

In another preferred embodiment of the magnetic component, the leg of the third U/UR core is abutting the outside of the first O-shaped core assembly, wherein the ends of a fourth U/UR core are abutting the ends of the third U/UR core, or that the ends of the third U/UR core are abutting the outside of the first O-shaped core assembly. Such a magnetic component comprising three or four U/UR cores is providing a basis for a LLC resonant converter, as will be described in more detail later.

Preferably the U/UR cores are bobbin less U/UR cores and the at least one winding is wound directly on the leg of the bobbin less U/UR cores. The tight core-winding coupling yields lower leakage, minimized copper power losses and inductance losses as well as minimized overall thermal resistance. Moreover, the power density increases and the costs are reduced with the absence of bobbins.

In a preferred embodiment one or more air gaps are arranged:
a) between the first U/UR core and the second U/UR core, and/or
b) between the third U/UR core respectively the fourth U/UR core and the first O-shaped core assembly.

With air gaps, the magnetizing inductance may be adjusted and saturation can be avoided. Air gaps don't need to be ground and are inserted at connection points between U/UR cores in order to adjust the reluctances and thus the magnetizing and filtering inductances. In order to improve mechanical stability, air gap are being distributed which engenders reduced AC winding power losses and reduced inductance losses caused by air gap fringing fields.

Whereas the air gaps may be left empty or filled with any suitable material, in a preferred embodiment, a non permeable material is inserted at the location of one or more air gaps. Therefore, the mechanical stability can be assured.

Preferably, the first and/or the second and/or the third respectively and/or the fourth U/UR core are arranged in a plane. The magnetic component is then relatively flat and prepared to be installed in flat spaces.

In an alternative embodiment, the first O-shaped core assembly is arranged in a plane and the third respectively and/or the fourth U/UR core are arranged orthogonal to that plane, wherein the third respectively and the fourth U/UR core are arranged either on the same side of the plane or on opposite sides of the plane. Therefore, the magnetic component is flexibly adaptable to desired geometries.

In a preferred embodiment, the U/UR cores comprise a low reluctance, high permeability, low saturation flux density core material with air gaps or a high reluctance, low permeability, high saturation flux density core material without air gaps. The magnetic component can be flexibly designed according to given requirements. For example, air gaps may negatively affect the manufacturing costs and high reluctance core material without air gaps may therefore reduce costs. On the other hand, air gaps may be used when very high saturation requirements have to be met. Additionally, to avoid the air gaps, cores of different materials such as ferrite or powder are assembled depending on whether low or high reluctance is required. Ferrite cores are located in low reluctance low saturation flux density area where energy is transformed (according to the requirements in a transformer) and powder cores are situated in high reluctance high saturation flux density area where energy is stored.

In a preferred embodiment, the axis of the legs of the U/UR cores are arranged essentially in parallel directions or the axis of the legs of the first and second U/UR core are arranged essentially in orthogonal direction to the axis of the legs of the third respectively and the fourth U/UR cores. Arranging the U/UR cores in parallel or in orthogonal position provides for more flexibility when assembling a magnetic component. Depending on the magnetic component to be assembled, one or the other direction of the legs of the U/UR cores may be advantageous.

In a preferred embodiment of the magnetic component,
a) a fifth and a sixth U/UR core are assembled—like the first and second U/UR core—to form a second O-shaped core assembly, wherein the first O-shaped core assembly is in a moved out position from the location abutting the third and fourth U/UR core and replaced by the second O-shaped core assembly abutting the third and fourth U/UR core,
b) a first and a second primary winding are wound directly on the first and the second U/UR core, wherein one end of the first and one end of the second primary winding are connected together, wherein the other end of the first respectively the second primary winding is connected to a first respectively a second primary connection point,
c) a first and a second secondary winding are wound directly on the first and the second U/UR core, wherein one end of the first and one end of the second secondary winding are connected together, and
d) a third respectively a fourth secondary winding are wound directly on the fifth respectively the sixth U/UR core and/or on the third respectively the fourth U/UR core, wherein one end of the third and one end of the fourth secondary winding and a third secondary connection point are connected together, wherein the other ends of the third respectively the fourth secondary winding are connected to the other ends of the first respectively the second secondary winding and to a first respectively to a second secondary connection point.

The third and fourth secondary winding are forming output inductors of the magnetic component. With high reluctance in the third and fourth U/UR core, the conduction and switching losses are minimized and the overall efficiency is improved.

In an alternative embodiment of the magnetic component,
a) a first and a second primary winding are wound directly on the first and the second U/UR core, wherein one end of the first and one end of the second primary winding are connected together, wherein the other end of the first respectively the second primary winding is connected to a first respectively a second primary connection point,
b) a first and a second secondary winding are wound directly on the first and the second U/UR core, wherein one end of the first and one end of the second secondary winding are connected together, c) a third respectively a fourth secondary winding are wound directly on the first respectively the second U/UR core and/or on the third respectively the fourth U/UR core, wherein one end of the third and one end of the fourth secondary winding and a third secondary connection point are connected together, wherein the other ends of the third respectively the fourth secondary winding are connected to the other ends of the first respectively the second secondary winding and to a first respectively to a second secondary connection point.

In this alternative embodiment, the number of U/UR cores is reduced to four. The size and costs of the magnetic component are reduced and the power density is improved.

In an alternative embodiment of the magnetic component,
a) a first and a second primary winding are wound directly on the first and the second U/UR core, wherein one end of the first and one end of the second primary winding are connected together, wherein the other end of the first respectively the second primary winding is connected to a first respectively a second primary connection point, and
b) a first and a second secondary winding are wound directly on the first and the second U/UR core, wherein one end of the first and one end of the second secondary winding and a third secondary connection point are connected together, wherein the other end of the first respectively the second secondary winding is connected to a first respectively to a second secondary connection point.

In this alternative embodiment, the transformer secondary windings and output inductor windings are integrated together. A tight coupling between primary windings and secondary windings leads to minimized leakage inductance.

In an alternative embodiment of the magnetic component,
a) a first and a second primary winding are wound directly on the first and the second U/UR core, wherein one end of the first and one end of the second primary winding are connected together, wherein the other end of the first respectively the second primary winding is connected to a first respectively a second primary connection point,
b) a first and a second secondary winding are wound directly on the first and the second U/UR core,
c) a third and a fourth secondary winding are wound directly on the first, the second, the third, and/or the fourth U/UR core, wherein one end of the third and one end of the fourth secondary winding are connected together, forming a second secondary windings connection point, wherein:
d) one end of the first and the second secondary winding and the other end of the third secondary winding are connected together, and the other end of the fourth secondary winding is connected to a third secondary connection point,
e) the other end of the first respectively the second secondary winding is connected to a first respectively to a second secondary connection point.

While maintaining the advantages described above, the magnetic component is prepared to be connected to a voltage source on the primary side comprising the first primary winding and the second primary winding and to be connected to a rectifier circuit on the secondary side comprising the first secondary winding and the second secondary winding.

In an alternative embodiment of the magnetic component,
a) a first primary winding is wound directly on the second U/UR core, wherein one end of the first primary winding is connected to a first primary connection point,
b) a third primary winding is wound directly on the third respectively the fourth U/UR core, wherein one end of the third primary winding is connected to a second primary connection point, wherein the other ends of the first and the third primary winding are connected together, and c) a first secondary winding is wound directly on the second U/UR core, wherein one end of the winding is connected to a first secondary connection point and the other end of the winding is connected to a second secondary connection point.

While maintaining the advantages described above, the magnetic component is prepared to be connected to a voltage source on the primary side comprising the first primary winding and the second primary winding and to be connected to a rectifier circuit on the secondary side comprising the first secondary winding and the second secondary winding.

In an alternative embodiment of the magnetic component,
a) a first primary winding is wound directly on the first U/UR core and a second primary winding is wound directly on the second U/UR core, wherein one end of the first and one end of the second primary winding are connected together,
b) a third and/or a fourth primary winding is wound directly on the third U/UR core, wherein one end of the third respectively one end of the fourth primary winding is connected to a first respectively to a second primary connection point, wherein the other end of the first and the other end of the second primary winding is connected to the other end of the third primary winding respectively to the first primary connection point and to the other end of the fourth primary winding respectively to the second primary connection point,
c) a first secondary winding is wound directly on the first U/UR core and a second secondary winding is wound directly on the second U/UR core, wherein one end of the first secondary winding is connected to a first secondary connection point, wherein one end of the second secondary winding is connected to a second secondary connection point, wherein the other ends of the first and second secondary winding are connected together and preferably to a third secondary connection point.

While maintaining the advantages described above, the magnetic component is prepared to be connected to a voltage source on the primary side comprising the first primary winding and the second primary winding and to be connected to a rectifier circuit on the secondary side comprising the first secondary winding and the second secondary winding.

In an preferred embodiment of the magnetic component,
a) the first and the second primary connection point are connected to a voltage source,
b) the first secondary connection point is connected to one end of a first rectifier,
c) the second secondary connection point is connected to one end of a second rectifier,
d) the third secondary connection point is connected to one end of a capacitor, and
e) the other ends of the first rectifier, the second rectifier and the capacitor are connected together.

The magnetic component and the attached circuits provide a switched mode power converter with improved power density, reduced costs, lower losses, improved efficiency and thermal stability.

Preferably, a U/UR core for forming a magnetic component comprises:
a) a first post, a second post, and a leg, wherein the U/UR core is built up such that—according to its shape—the first post and the second post have free ends on one side and a leg connecting the first post and the second post on their other side, and
b) at least one winding wound directly on the U/UR core.

The U/UR core can be flexibly used to assemble integrated magnetic components.

Preferably, a method for assembling a magnetic component has the steps:
a) winding at least one winding directly on a first, a second, and a third respectively and a fourth U/UR core,
b) assembling the first and the second U/UR core with their free ends abutting each other to form a O-shaped core assembly, and
c) assembling the third respectively the fourth U/UR core abutting an outside of the O-shaped core assembly.

Assembly of a magnetic component is therefore simple and can be carried out in few steps within a short time.

Preferably, the method for assembling a magnetic component further comprises the step:
a) connecting one or more ends of the windings wound on the U/UR cores together and/or to at least one connection point.

Therefore, the magnetic component can be electrically functional in a simple and fast manner.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

PREFERRED EMBODIMENTS

The present invention provides integrated magnetic structures using bobbin less U/UR cores on whose leg the windings are directly wound. The tight core-winding coupling yields lower leakage and minimized copper power losses and inductance losses. Moreover the power density increases and the cost are reduced with the absence of bobbins. The U/UR cores are used as building blocks which make their assembly more flexible. Air gaps don't need to be ground and are inserted at connection points between U/UR cores in order to adjust the reluctances and thus the magnetizing and filtering inductances. Also due to mechanical stability, air gap are being distributed which engenders reduced AC winding power losses and minimized inductance losses caused by air gap fringing fields. The core structure can either be fully composed of high permeability low saturation cores with air gaps or be composite comprising low permeability high saturation cores and high permeability low saturation cores with no air gaps.

Integrated Magnetic Component for Current Doubler Rectifier

Figure 1:
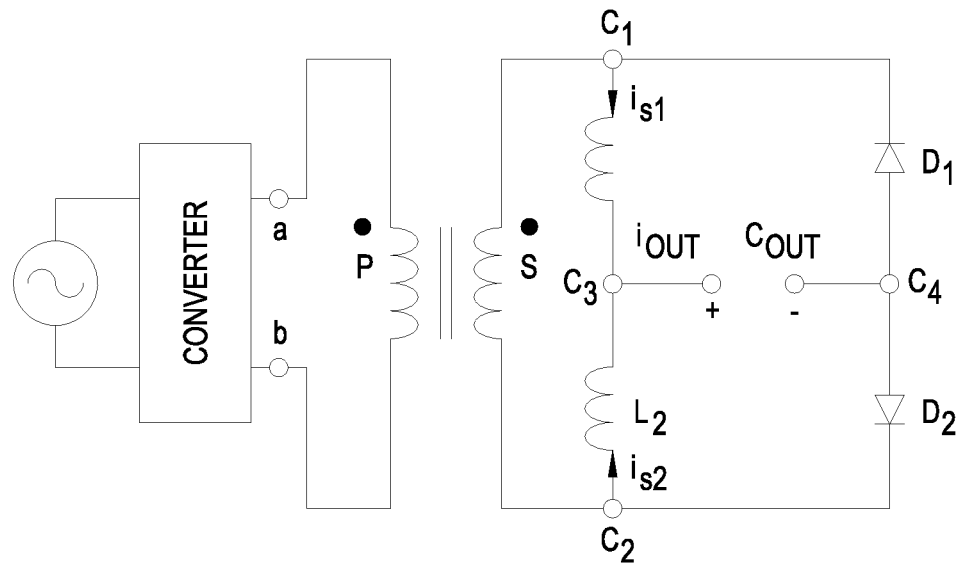
FIG. 1 the circuit configuration of the converter with current-doubler rectifier.

The integrated magnetic structures proposed in the present invention are implemented in the circuit configuration shown in FIG. 1, a current-doubler rectifier, which can be used with different double-ended primary topologies such as forward, two transistors-forward, push-pull, half bridge or full bridge converter. The current-doubler rectifier circuit, habitually applied for low voltage and high current outputs, uses one two-winding transformer and two output inductors $L_1$ and $L_2$. In FIG. 1 the primary winding of transformer is P and the secondary winding of transformer is S.

Figure 2:
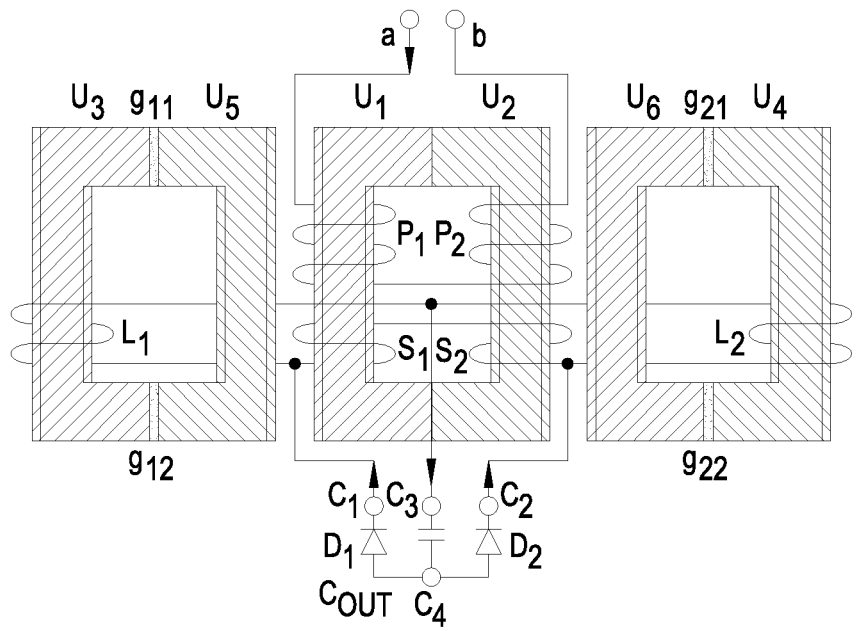
FIG. 2 the structure of discrete magnetic components for current-doubler rectifier.

FIG. 2 illustrates the configuration of discrete magnetic components for current-doubler rectifier using U/UR cores. The discrete components are a transformer and two inductors. The transformer comprises four sub windings: a first and second primary winding, $P_1$ and $P_2$, as well as a first and second secondary winding, $S_1$ and $S_2$. The first primary winding $P_1$ and the first secondary winding $S_1$ are wound on a first U/UR core $U_1$. The second primary winding $P_2$ and the second secondary winding $S_2$ are wound on a second U/UR core $U_2$. The two primary windings, $P_1$ and $P_2$, are connected in series and the two secondary windings, $S_1$ and $S_2$, as well are connected in series. The primary-secondary coupling aims to achieve minimized leakage inductance. The first and second U/UR cores, $U_1$ and $U_2$ are connected without air gap although an air gap could be inserted between both U/UR cores in order to adjust the magnetizing inductance. Either inductor winding is also wound on a U/UR core, $U_3$ or $U_4$, which is then connected to another U/UR core or to a plate, $U_5$ or $U_6$ respectively, via distributed air gaps, $g_{11}$ and $g_{22}$ or $g_{21}$ and $g_{22}$ respectively, as shown in FIG. 2. This configuration results, additionally to the number of discrete magnetic components which yield higher size and costs, in four high current windings losses and several high interconnection losses which negatively impact the efficiency.

Figure 3A:
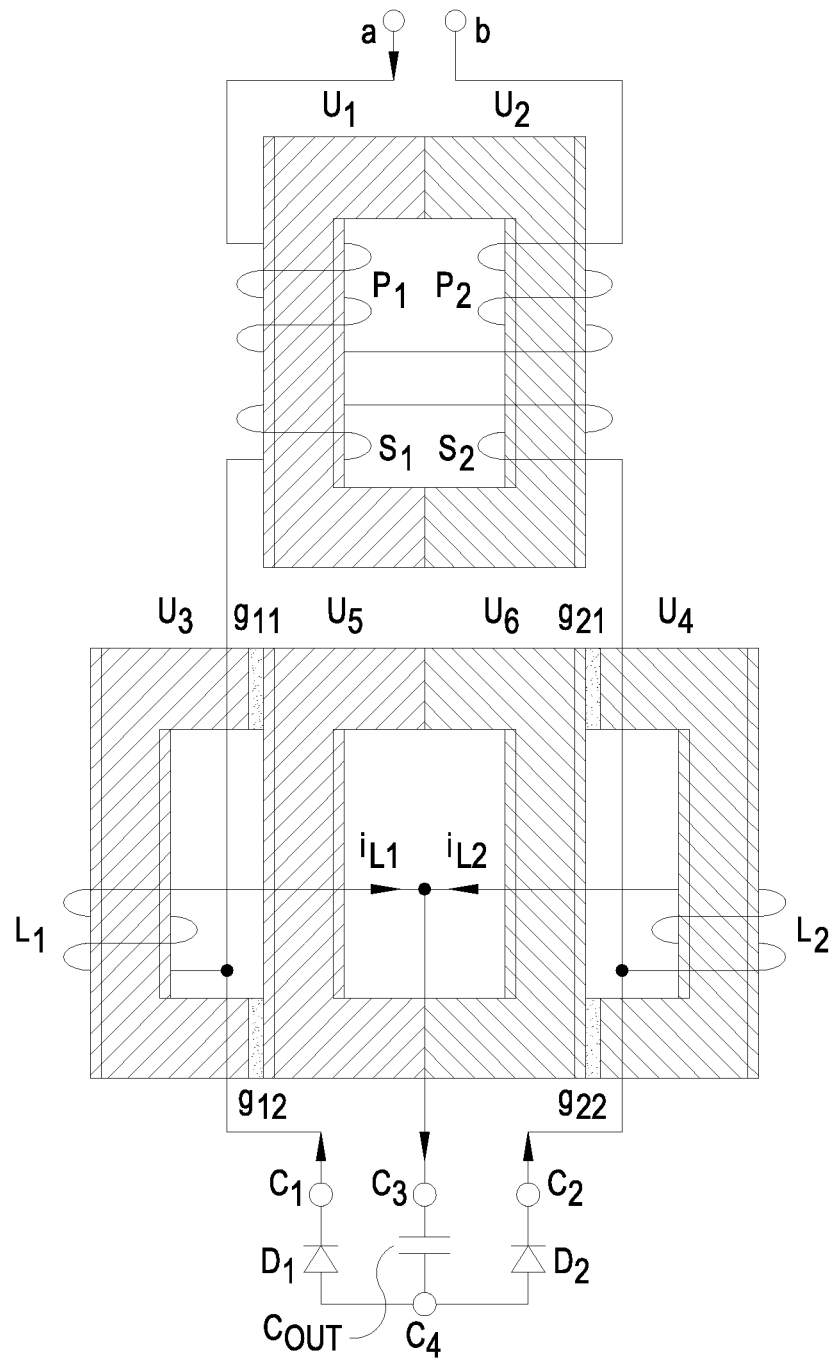
FIG. 3a, 3b two aspects of the first proposed structure of integrated magnetic component (coupled inductors) for current-doubler rectifier with ferrite cores and distributed air gaps.
Figure 3B:
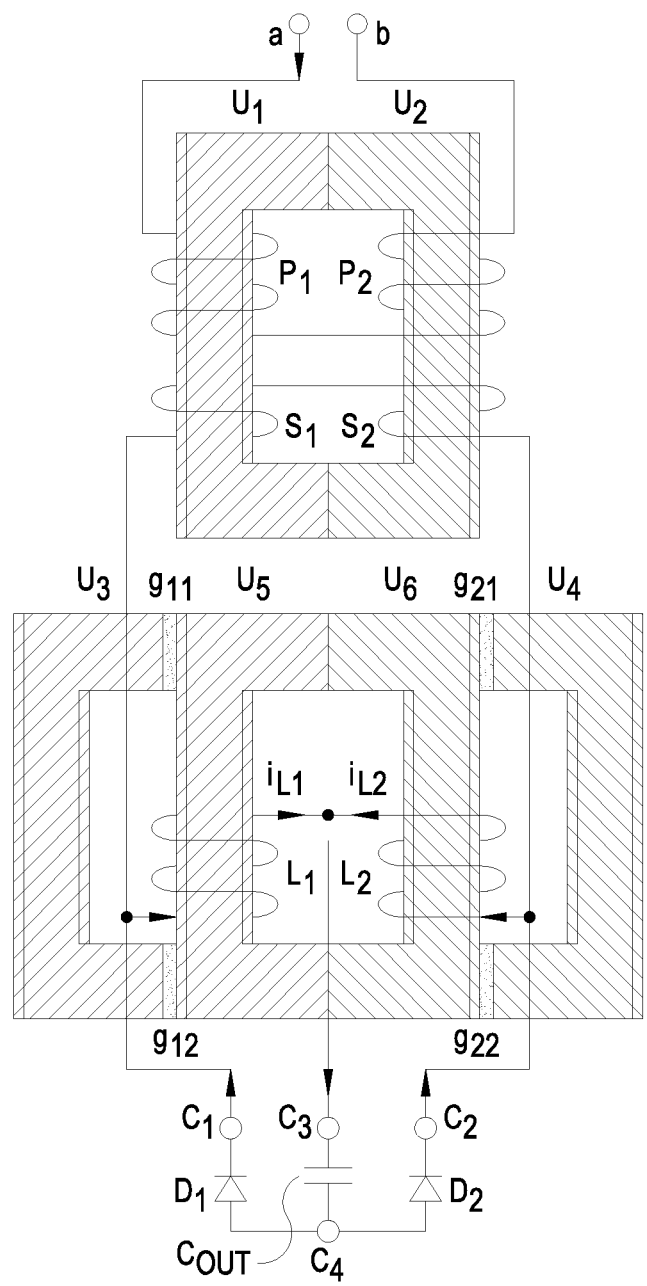

To improve the discrete components structure in the first step, both output inductors $L_1$ and $L_2$ are coupled on a single core structure, which reduces the number of magnetic components to two. In the proposed coupled inductors structures both inductor windings are either wound on outer U/UR cores $U_3$ or $U_4$ as shown in FIG. 3a or are wound on inner U/UR cores $U_5$ and $U_6$ as shown in FIG. 3b. The windings are so wound, that the fluxes induced by inductor currents $i_{L1}$ and $i_{L2}$ have opposite directions around the outer cores and add in the inner cores.

Figure 4A:
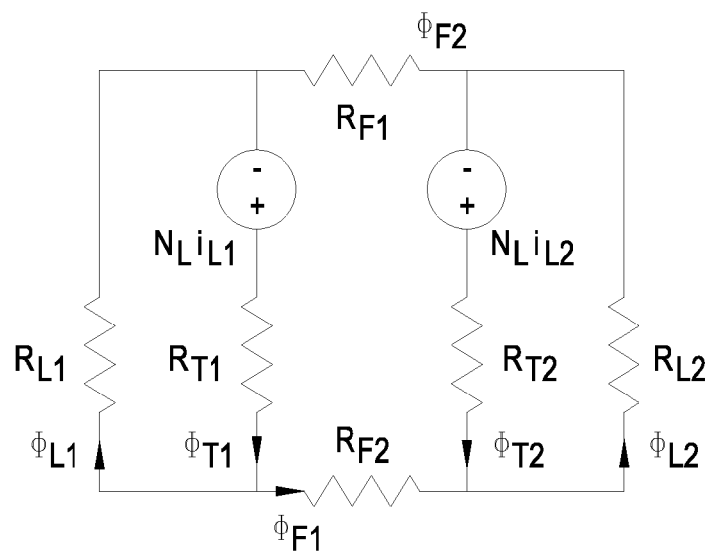
FIG. 4a the reluctance model of the coupled inductors for current-doubler rectifier of structure illustrated in FIG. 3b.

The corresponding reluctance model of the proposed coupled inductors structure of current-doubler rectifier in FIG. 3b is shown in FIG. 4a. $R_{L1}$ and $R_{L2}$ represent the reluctances of outer cores $U_3$ and $U_4$ and their respective distributed air gaps. $R_{T1}$ and $R_{T2}$ represent the reluctances of legs of inner cores $U_5$ and $U_6$. $R_{F1}$ represents the sum of reluctances of upper flanges of both inner cores $U_5$ and $U_6$ and $R_{F2}$ represents the sum of reluctances of their lower flanges.

Due to symmetrical build-up of structure the following can be assumed:

$R_{T1}=R_{T2}=R_T$, $R_{L1}=R_{L2}=R_L$ and $R_{F1}=R_{F2}=R_F$.

After mathematical description of the reluctance model and some equations manipulation the mutual inductance of both inductor windings M and the output filtering inductance $L_f$ are calculated to be:

$$M = \frac{N_s^2 \cdot R_L^2}{2 \cdot (R_T + R_L) \cdot (R_T(R_L + R_F) + R_L R_F)}$$

and $$L_f = \frac{N_s^2}{R_T + R_L}.$$

In the further analysis, additionally to the filtering inductance $L_f$, the coupling coefficient k is described as $$k = \frac{M}{\sqrt{(M + L_f) \cdot (M + L_f)}} = \frac{M}{M + L_f}$$

$$= \frac{1}{1 + 2\frac{R_T(R_L + R_F) + R_L R_F}{R_L^2}} = \frac{1}{1+\varepsilon}.$$

Figure 4B:
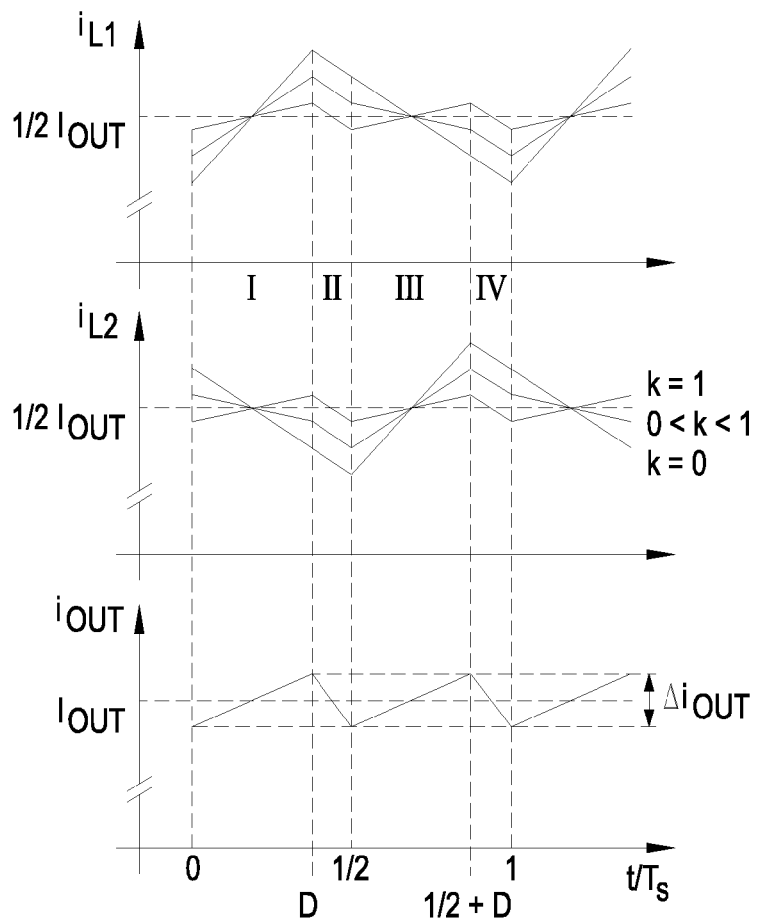
FIG. 4b, 4c the winding current and core flux waveforms of the proposed structure of integrated magnetic component in FIG. 3b.

For $R_L \gg R_T$ and $R_L \gg R_F$, $\varepsilon \approx 0$ and the coupling coefficient moves toward 1. In the praxis the coupling coefficient is lower than 0.9. Since the current waveforms of $i_{s1}$ and $i_{s2}$ are identical but shifted 180 degrees in phase, the coupling coefficient affects them but has no impact on the output current $i_{out}$ as noticed from FIG. 4b. The larger the coupling coefficient k, the lower the secondary current ripples. Thus, with very high reluctance $R_L$ at outer cores, the conduction and switching losses are minimized, and the overall efficiency is improved.

The ripple output current is defined as:

$$\Delta i_{out} = \frac{V_{out} \cdot T_s}{L_f}(1 - 2 \cdot D)$$

Applying the Faraday's formula on the inductor windings, it is shown that the AC flux ripple in the legs of inner cores, $U_5$ and $U_6$ as well as in the outer cores, $U_3$ and $U_4$, are respectively expressed by:

$$\Delta \Phi_{T1} = \Delta \Phi_{T2} = \frac{V_{out} \cdot T_s}{N_s}(1 - D) \text{ and}$$

$$\Delta \Phi_{L1} = \Delta \Phi_{L2} = \frac{V_{out} \cdot T_s}{N_s}\left(\frac{1}{2} - D + \frac{1}{2}\frac{R_F}{R_L + R_F}\right).$$

D is the operation duty cycle and $T_s=1/f_s$ is the switching period. Assuming that DC values of secondary winding currents $i_{s1}$ and $i_{s2}$ are identical $$\left(I_{s1} \approx I_{s2} \approx \frac{I_{out}}{2}\right),$$

it can be derived that the average DC fluxes in all legs of the structure are equal, $$\Phi_{T1,T2,L1,L2,DC} \approx \frac{L_f}{N_s} \frac{I_{out}}{2}.$$

With given parameters as core cross section, reluctance, maximum flux density and turn numbers, this approximated flux value is used to determine the air gap length needed to avoid saturation of outer cores.

The AC flux ripples and DC flux in flanges of inner cores are calculated as:

$$\Delta\Phi_{F1} = \Delta\Phi_{F2} = \Delta\Phi_T - \Delta\Phi_L = \frac{V_{out} \cdot T_s}{2 \cdot N_s} \frac{R_L}{R_L + R_F} \text{ and}$$

$$\Phi_{F1,F2,DC} \approx 0.$$

Figure 4C:
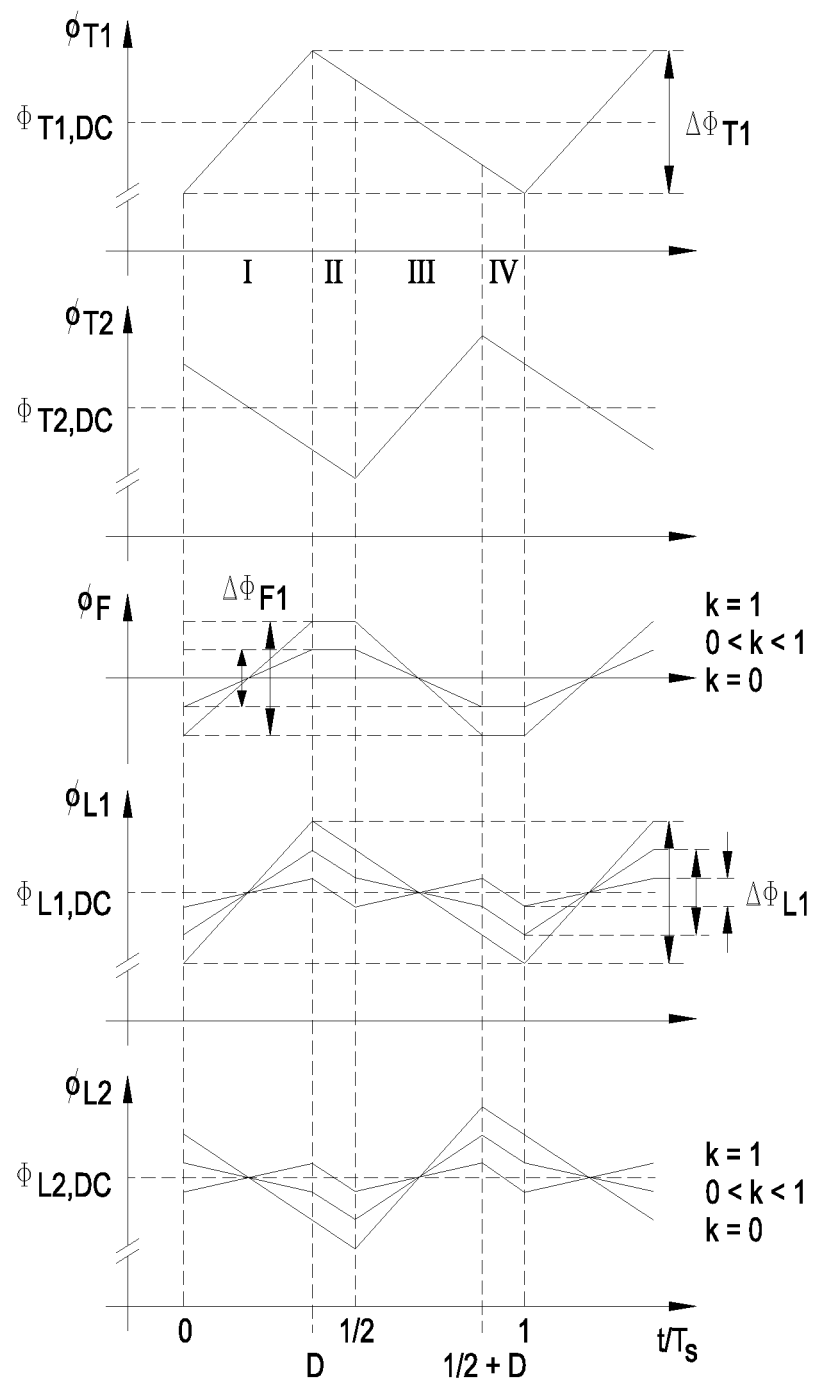

FIG. 4c illustrates the core flux waveforms of the proposed structure of integrated magnetic component in FIG. 3b. The coupling coefficient has no impact on fluxes of both inner cores $U_5$ and $U_6$ since both cores are magnetically, tightly coupled together. On the contrary the waveform of the fluxes of both outer cores $U_3$ and $U_4$ heavily depends on the coupling coefficient value. For high coupling coefficient, k>0.85, these flux waveforms are approximately identical and in-phase with minimum ripples. The lower the coupling coefficient k, the larger the outer cores flux ripples. It is to be noticed, that the ripple of flux of inner core flanges $\Delta\Phi_{F1}$ and $\Delta\Phi_{F2}$ are equal and increases with larger coupling coefficient. In order to minimize the negative impact of this high flux ripple it is essential to keep the length of the flanges as short as possible. Since the duty cycle is mostly designed to be close to 0.5, the ripple fluxes of the proposed structure are minimized which implies overall reduction of core losses.

Figure 5A:
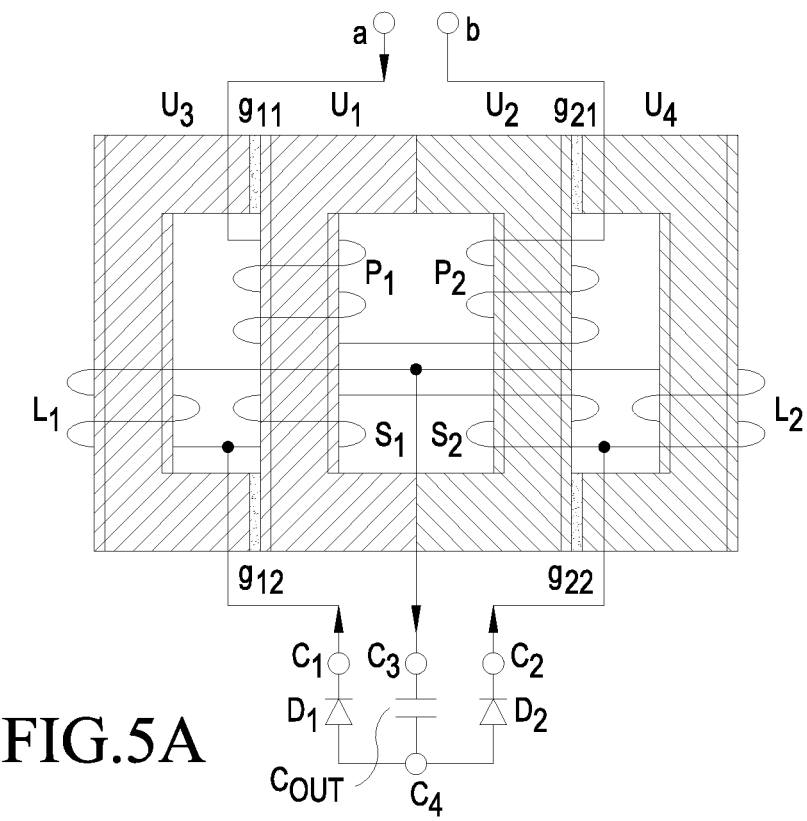
FIG. 5a, 5b two aspects of the second proposed structure of integrated magnetic component for current-doubler rectifier with ferrite cores and distributed air gaps, wherein only core integration is applied.

In the second step toward integration, a further core integration is considered in FIG. 5a, whereby the size and costs are reduced and the power density improved. In this second structure of integrated magnetic components the number of core parts is reduced from six to four U/UR cores. While the unwound core parts, $U_5$ or $U_6$, of the inductors are removed, the wound U/UR cores, $U_3$ or $U_4$, are connected to the unchanged discrete transformer described above, in such a way that the functionality of the converter and the current-doubler rectifier is still being guaranteed. The structure is still consisted of six windings but of four U/UR cores: A first and second primary winding, $P_1$ and $P_2$, as well as a first, second, third and fourth secondary winding, $S_1$, $S_2$, $L_1$ and $L_2$ respectively. The first primary winding $P_1$ and the first secondary winding $S_1$ are tightly wound on a first bobbin less U/UR core. The second primary winding $P_2$ and the second secondary winding $S_2$ are tightly wound on a second bobbin less U/UR core. The two primary windings, $P_1$ and $P_2$, are connected in series and the two secondary windings, $S_1$ and $S_2$, as well are connected in series. A third secondary winding $L_1$ is wound on a third bobbin less U/UR core $U_3$ and a fourth secondary winding $L_2$ is wound on a fourth bobbin less U/UR core $U_4$. The secondary windings $L_1$ and $L_2$ are inductor windings. The inductor windings $L_1$, $L_2$ and the capacitor $C_{out}$ are connected together at third connection point $c_3$. The secondary winding $S_1$, the inductor winding $L_1$ and the first rectifier $D_1$ are connected at first connection point $c_1$ while the secondary winding $S_2$, the inductor winding $L_2$ and the second rectifier $D_2$ are connected at second connection point $c_2$. The core $U_3$ is connected to the core $U_1$ via the distributed air gaps $g_{11}$ and $g_{12}$ while the cores $U_4$ and $U_2$ are connected via the distributed air gaps $g_{21}$ and $g_{22}$. Although the cores $U_1$ and $U_2$ are mostly connected without gaps, small air gaps sometimes are inserted in order to adjust the magnetizing inductance. The integrated magnetic structure in FIG. 5b operates approximately as that in FIG. 5a whereby the two secondary windings $L_1$ and $L_2$ are in this case wound on cores $U_1$ and $U_2$ respectively, instead of $U_3$ and $U_4$. Even though there are major improvements with the core integration, the number of high current secondary windings and the number of high current interconnections are still key setbacks.

Figure 5B:
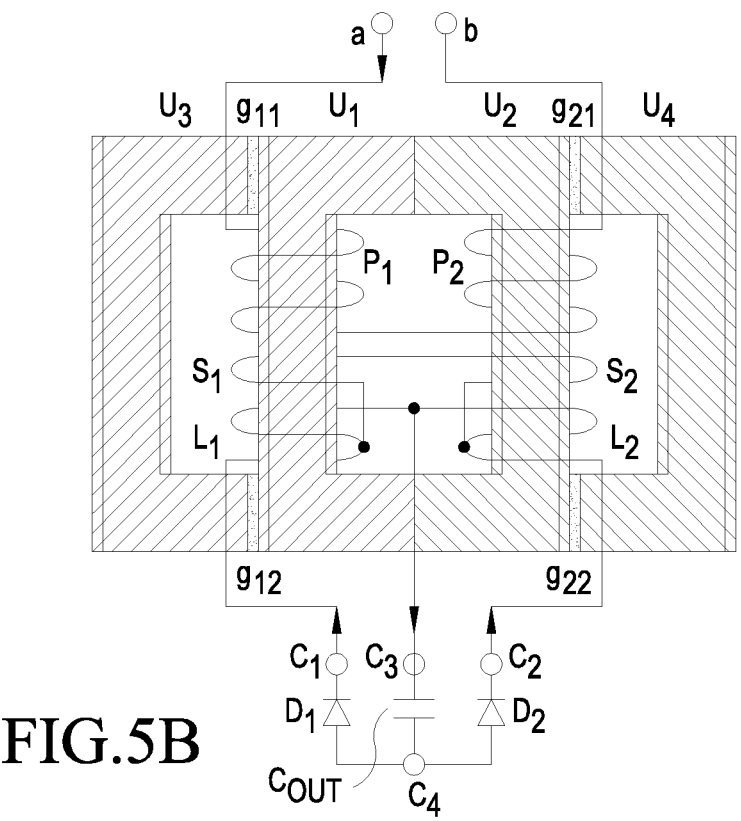

A further step of improvement is implemented by winding integration since the four secondary windings in FIGS. 5a and 5b still cause high conduction losses. The secondary windings $S_1$ and $S_2$ in FIGS. 5a and 5b are completely removed, without severely altering the functionality of the rectifier circuit, to result in the fully integrated magnetic structure illustrated in FIG. 6. Not only are the transformer and inductors cores integrated into a single core assembly, but also the transformer secondary windings, $S_1$ and $S_2$, and the inductors windings, $L_1$ and $L_2$, are respectively integrated together. The first primary winding $P_1$ and the first secondary winding $S_1$ are tightly wound on a first bobbin less U/UR core. The second primary winding $P_2$ and the second secondary winding $S_2$ are tightly wound on a second bobbin less U/UR core. The two primary windings, $P_1$ and $P_2$, are connected and the two secondary windings, $S_1$ and $S_2$, as well are connected. A third bobbin less U/UR core $U_3$ and a fourth bobbin less U/UR core $U_4$ are left without wound winding. The secondary windings $S_1$, $S_2$ and the capacitor $C_{out}$ are connected together at third connection point $c_3$. The secondary winding $S_1$ and the first rectifier $D_1$ are connected at first connection point $c_1$ while the secondary winding $S_2$ and the second rectifier $D_2$ are connected at second connection point $c_2$. The core $U_3$ is connected to the core $U_1$ via distributed air gaps $g_{11}$ and $g_{12}$ while the cores $U_4$ and $U_2$ are connected via distributed air gaps $g_{21}$ and $g_{22}$. Just two high current windings and four high current interconnections remain which induce minimized conduction and interconnection losses. The tight coupling between primary windings and secondary windings leads to minimized leakage inductance.

Figure 6:
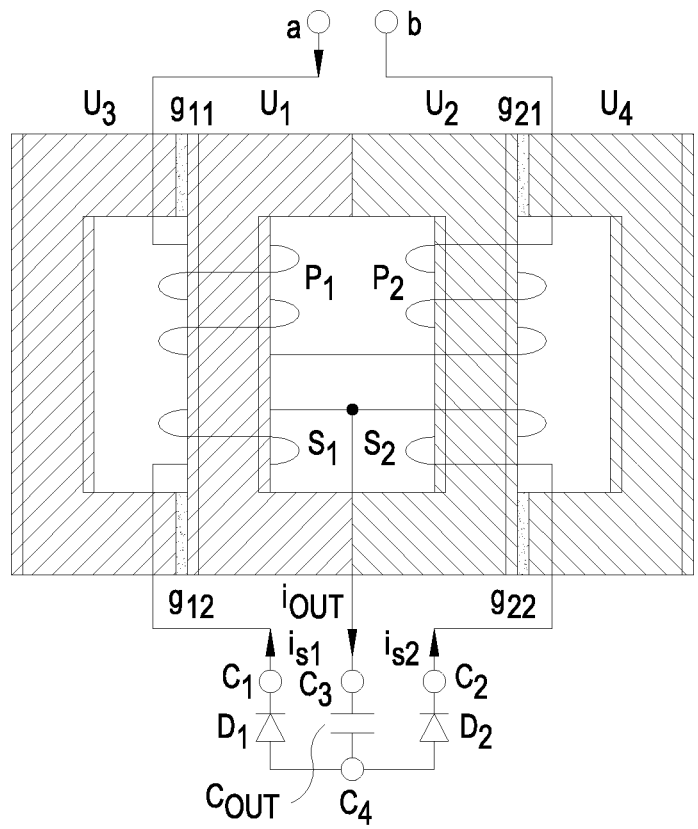
FIG. 6 the third proposed structure of integrated magnetic component for current-doubler rectifier with ferrite cores and distributed air gaps, wherein core integration as well as winding integration is fulfilled.
Figure 7A:
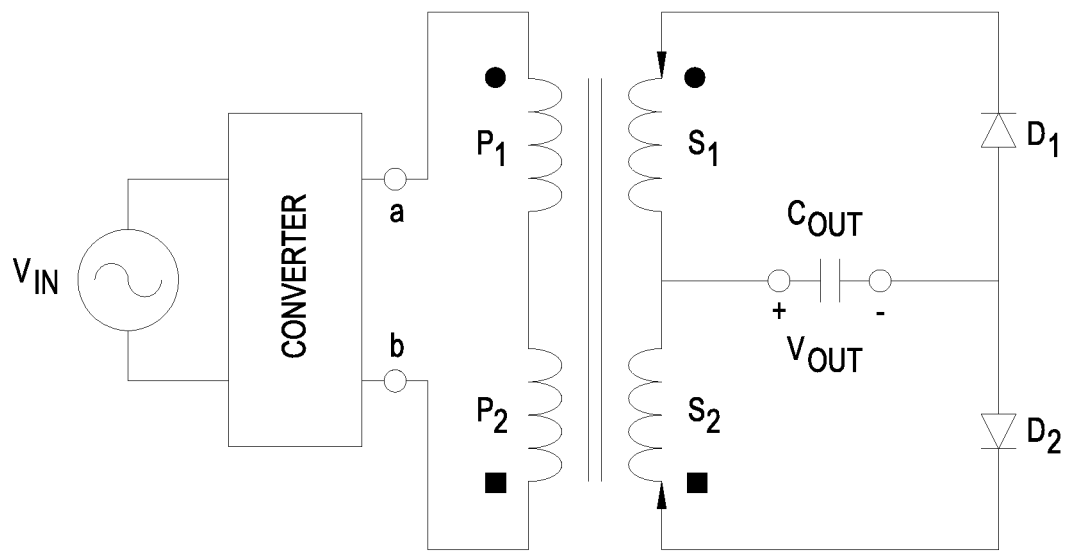
FIG. 7a, 7b equivalent schematic circuit diagrams of structure in FIG. 6 as coupled inductors as well as transformer and inductors coupled together respectively.
Figure 7B:
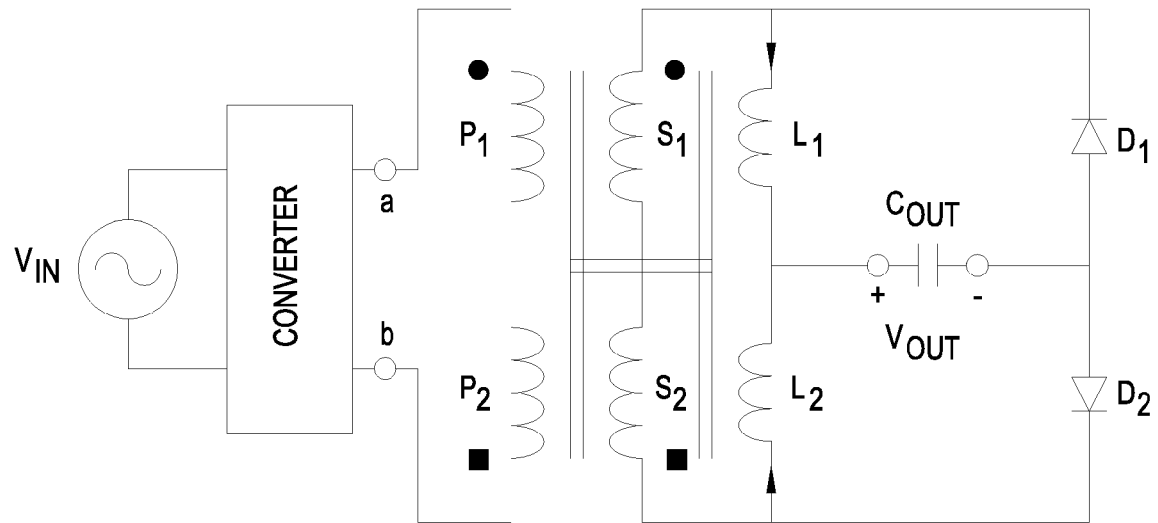

FIG. 7a shows schematic circuit diagram of current-doubler rectifier structure in FIG. 6 where the windings are represented as coupled inductors. This schematic circuit diagram is equivalent to that in FIG. 7b where the transformer primary and secondary windings as well as the virtual secondary inductor windings are illustrated. The transformer and inductors windings are fully coupled together.

Figure 8:
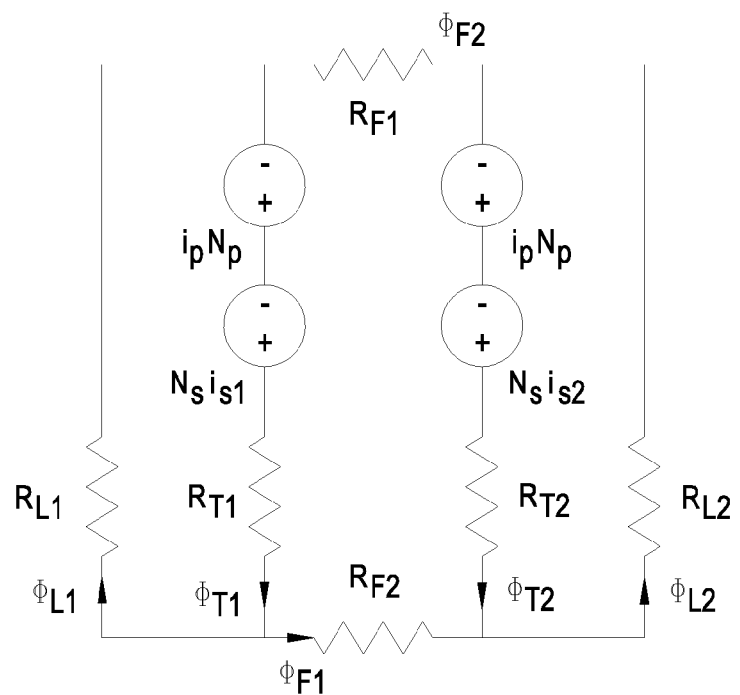
FIG. 8 the reluctance model of integrated magnetic component for current-doubler rectifier of structure illustrated in FIG. 6.

The corresponding reluctance model of integrated magnetic component for structure of current-doubler rectifier in FIG. 6 is shown in FIG. 8. $R_{L1}$ and $R_{L2}$ represent the reluctances of outer cores $U_3$ and $U_4$ and their respective distributed air gaps. $R_{T1}$ and $R_{T2}$ represent the reluctances of legs of inner cores $U_1$ and $U_2$. $R_{F1}$ represents the sum of reluctances of upper flanges of both inner cores $U_1$ and $U_2$ and $R_{F2}$ represents the sum of reluctances of their lower flanges.

After mathematical description of the reluctance model and some equations manipulation the primary magnetizing inductance $L_m$ is calculated to be:

$$L_m = \frac{2 \cdot N_p^2 \cdot (R_L + R_F)}{R_T(R_L + R_F) + R_L R_F} = \frac{2 \cdot N_p^2}{R_T + R_L /\!/ R_F}.$$

The output filtering inductance $L_f$ and the mutual inductance M of both secondary windings are expressed as defined above with the coupled inductors.

Flux waveforms of the structure proposed in FIG. 6 are the same, with the waveforms of the coupled inductors structure in FIG. 3b, as depicted in FIG. 4c. Waveforms of inner cores fluxes $\phi_{T1}$ and $\phi_{T2}$ are identical but shifted 180 degrees in phase. So are the waveforms of outer core fluxes $\phi_{L1}$ and $\phi_{L2}$. The coupling coefficient which is the same as with coupled inductors has no impact on flux waveforms of tightly coupled inner cores $U_1$ and $U_2$. The larger the coupling coefficient, the lower the ripple flux of inner cores, $\Delta\Phi_{s1}$ and $\Delta\Phi_{s2}$, and the larger the ripple flux of the flanges, $\Delta\Phi_{F1}$ and $\Delta\Phi_{F2}$. The current waveforms of secondary windings are shown in FIG. 11b. Since the secondary winding and the inductor windings, as shown discrete in FIG. 3b, are integrated in this proposed component structure, the secondary windings no longer always share the output current. When the primary voltage between potential points a and b is positive, the diode $D_1$ conducts and $D_2$ is reverse biased leading to $i_{s1}=i_{out}$ and $i_{s2}=0$ in phase I. When the primary voltage is negative the diode $D_2$ conducts and $D_1$ is reverse biased leading to $i_{s1}=0$ and $i_{s2}=i_{out}$ in phase III. When the primary voltage is zero both diodes $D_1$ and $D_2$ conduct and the secondary windings together share the output current $i_{s1}+i_{s2}=i_{out}$ in phases II and IV.

Figure 9A:
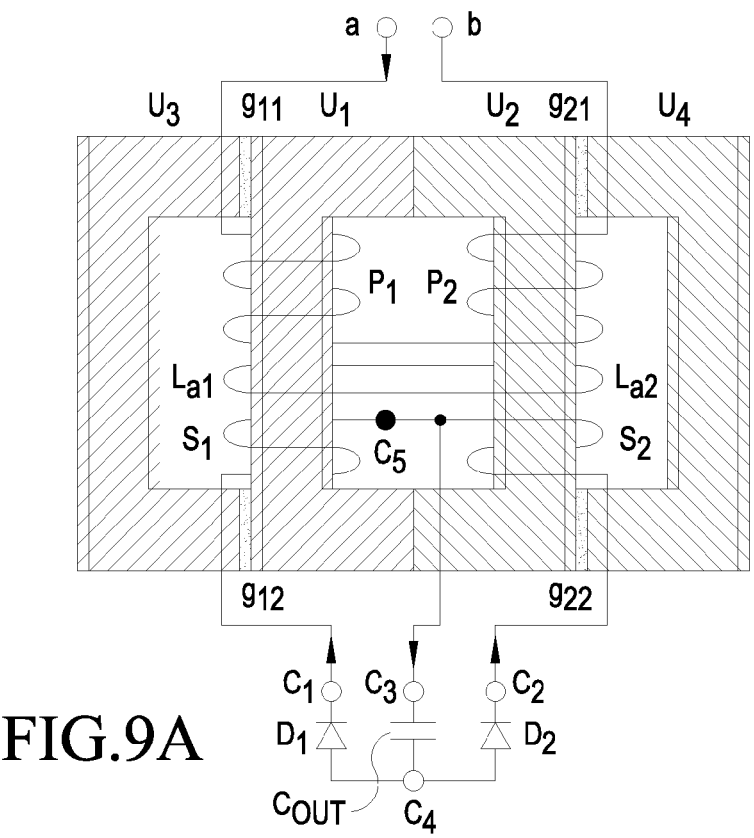
FIG. 9a, 9b two aspects of the fourth proposed structure of integrated magnetic component for current-doubler rectifier with ferrite cores and distributed air gaps, wherein core integration as well as winding integration is applied and the output current filtering is improved.
Figure 9B:
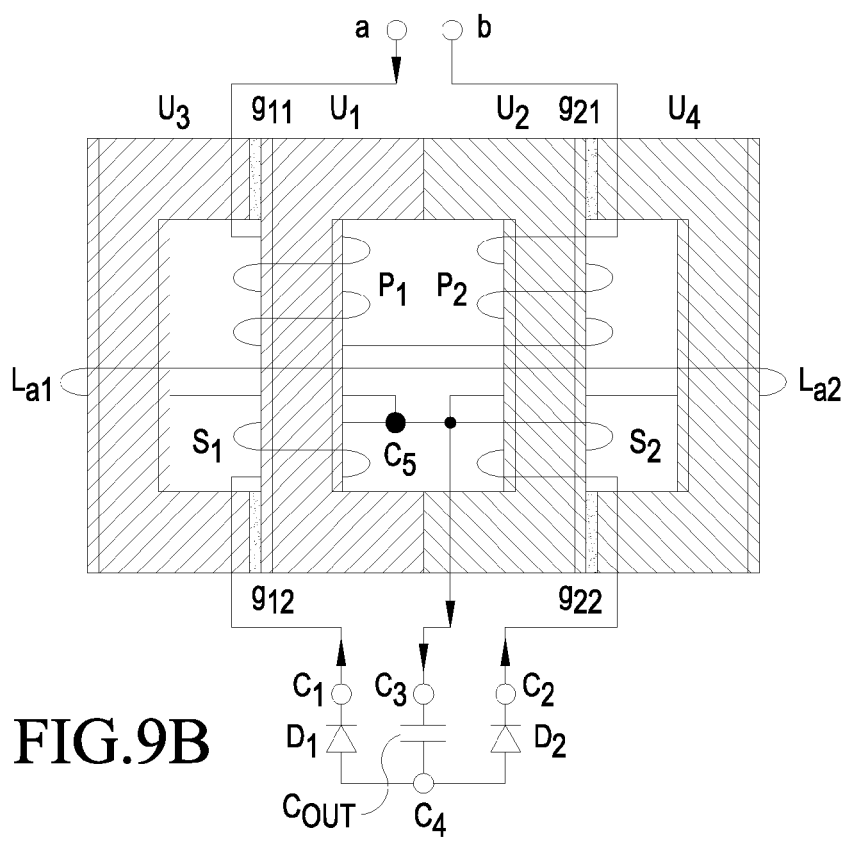
Figure 9C:
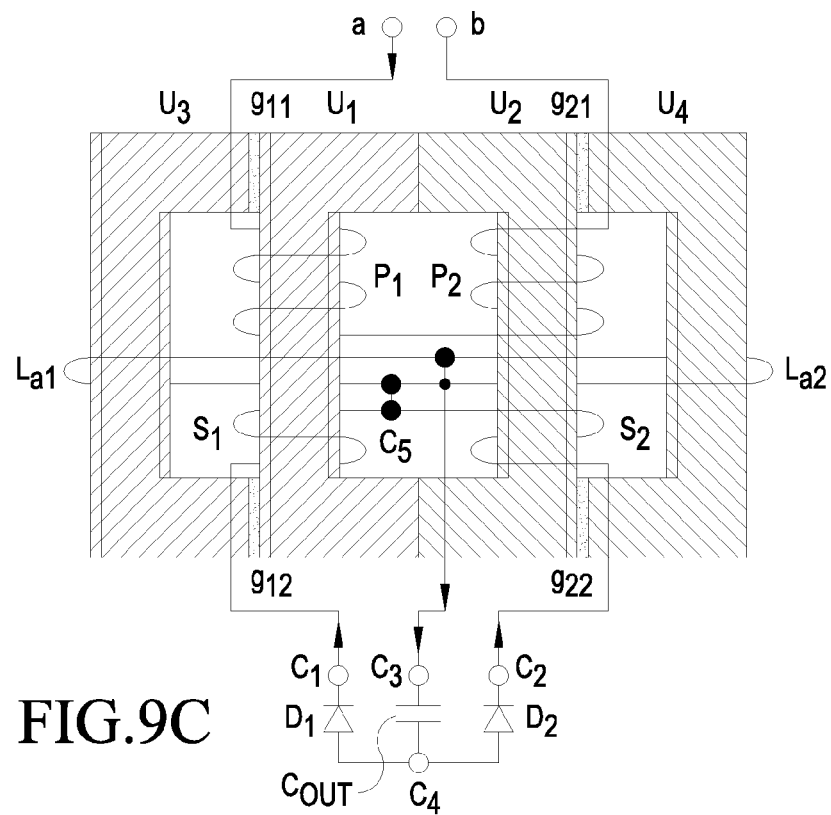
FIG. 9c same as FIG. 9b but with output filtering windings connected in parallel.

Major improvements of the magnetic integrated component have been made so far. Through core and winding integration as well as tight coupling of primary and secondary windings and distribution of air gaps, power and inductance losses have been minimized leading to further improvement of the overall efficiency. Due to the high output current and ripple of the secondary currents $i_{s1}$ and $i_{s2}$ of the integrated magnetic structure in FIG. 6, the secondary turn number is so determined, that the core saturation is just avoided and the winding conduction as well as AC losses minimized. The reduced secondary turn number $N_s$ limits the filtering inductance $L_f$, which in turn implies an increase of the output current ripple $\Delta i_{out}$. A viable solution to this problem is to introduce additional windings as illustrated in FIGS. 9a and 9b, where, for the sake of symmetry, the supplementary output winding is spilt respectively on both inner cores or on both outer cores. FIG. 9c illustrates a magnetic integrated component where windings are connected in parallel. In FIG. 9c windings $L_{a1}$ and $L_{a2}$ are connected in parallel. However, any of the windings may be connected in parallel. This applies to any magnetic integrated component disclosed above or below.

Figure 10:
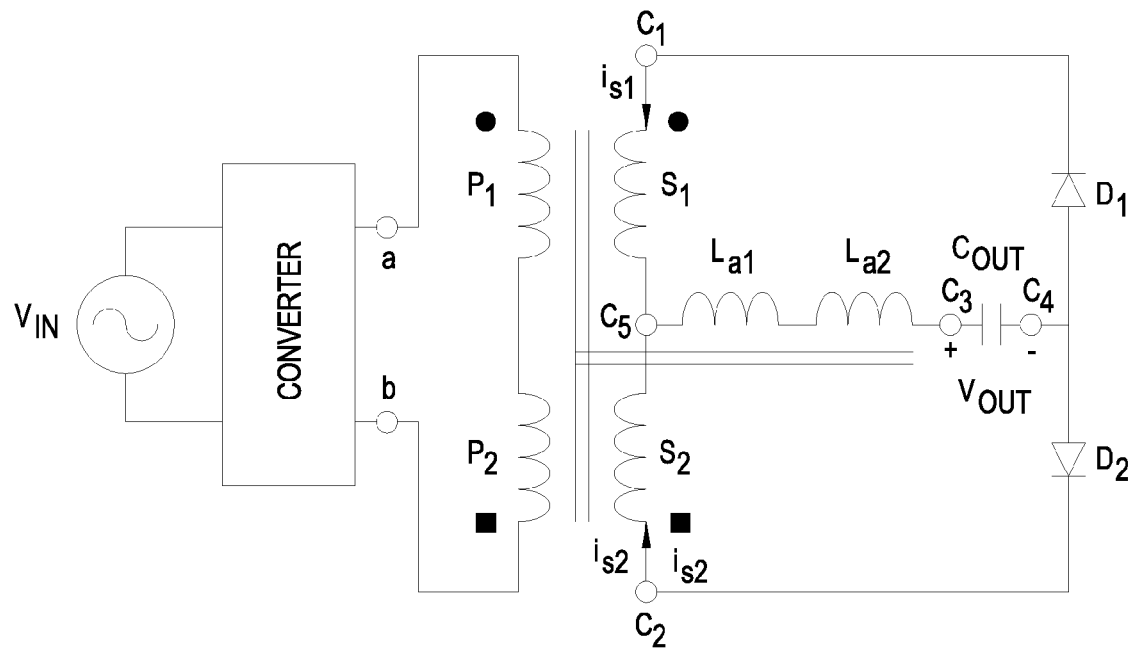
FIG. 10 equivalent schematic circuit diagram of structure in FIGS. 9a and 9b as coupled inductors.

FIG. 10 shows schematic circuit diagram of current-doubler rectifier structure in FIGS. 9a and 9b where the primary, secondary and additional output inductor windings are coupled together, in order to reduce leakage losses.

Figure 11A:
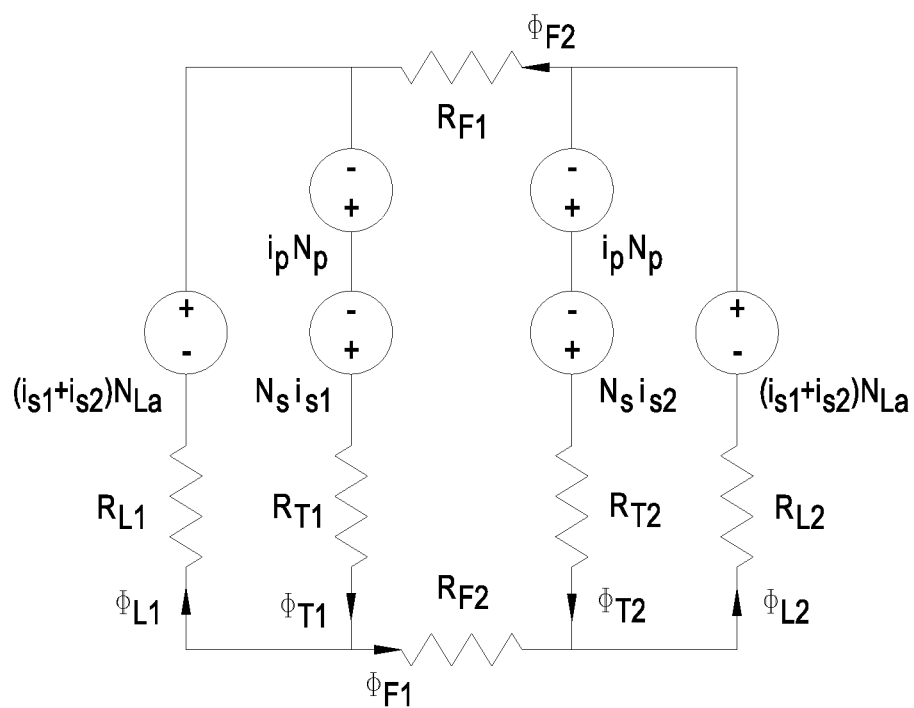
FIG. 11a the reluctance model of integrated magnetic component for current-doubler rectifier of structure illustrated in FIG. 9b.
Figure 11B:
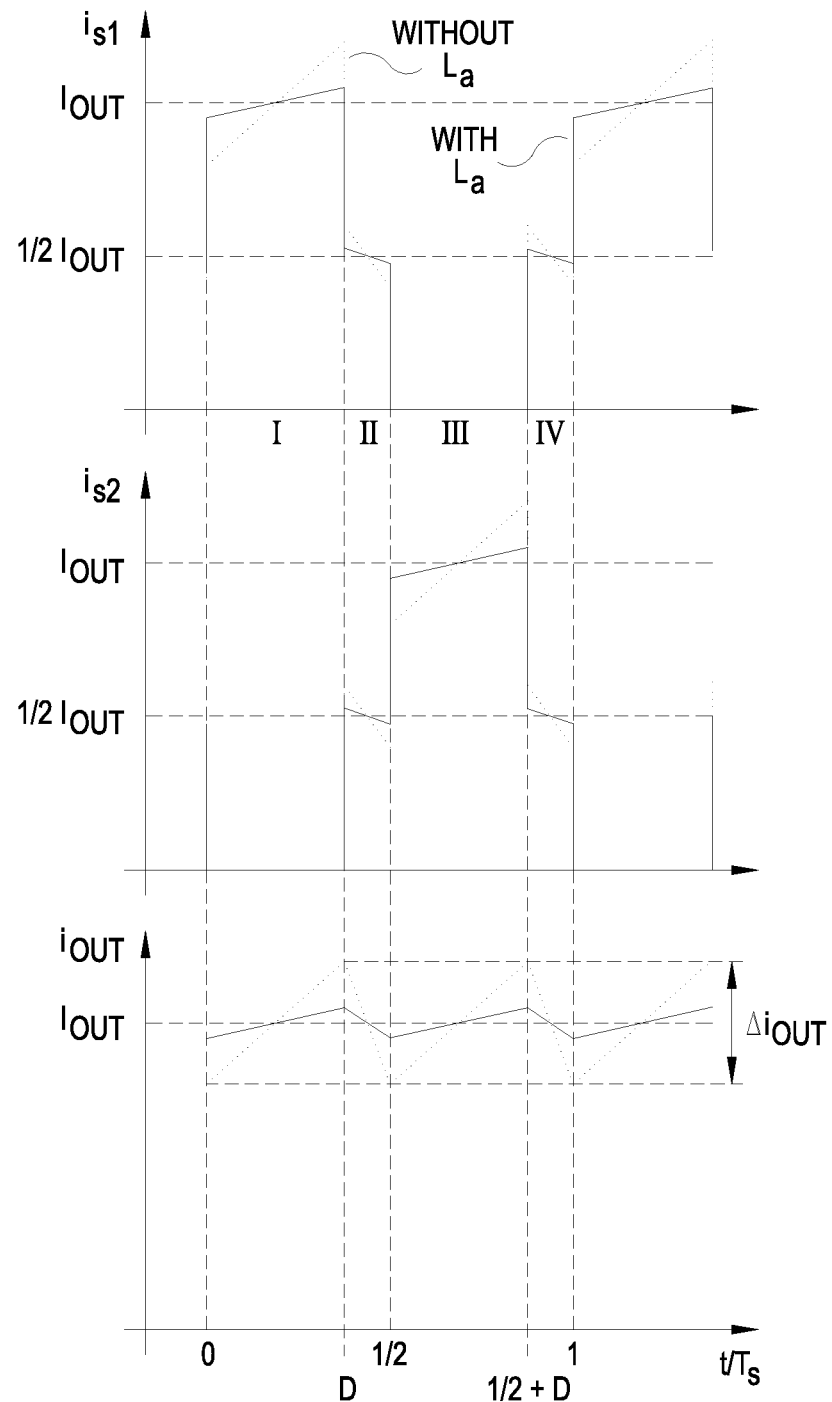
FIG. 11b, 11c the winding current and core flux waveforms of the proposed structure of integrated magnetic component in FIG. 9b.

The corresponding reluctance model of integrated magnetic component for structure of current-doubler rectifier in FIG. 9b is shown in FIG. 11a. After mathematical description of this reluctance model and some equations manipulation it results, that while the magnetizing inductance $L_m$ is unaffected, the enhanced filtering inductance $L_{fa}$ and the mutual inductance of both secondary windings are defined respectively as:

$$L_{fa} = \frac{(N_s + 2N_{La})^2}{R_T + R_L} \text{ and}$$

$$M_a = \frac{N_s^2 \cdot R_L^2}{2 \cdot (R_T + R_L) \cdot (R_T(R_L + R_F) + R_L R_F)} - \frac{2 N_{La} \cdot (N_s + N_{La})}{(R_T + R_L)}.$$

The output current ripple is given by:

$$\Delta i_{out} = \frac{V_{out} \cdot T_s}{L_{fa}} (1 - 2 \cdot D).$$

The ripple fluxes of inner and outer core legs are determined to be $$\Delta\Phi_{T1} = \Delta\Phi_{T2} = \frac{V_{out} \cdot T_s}{N_s + 2 \cdot N_{La}} \left(1 - D + \frac{N_{La}}{N_s}\right) \text{ and}$$

$$\Delta\Phi_{L1} = \Delta\Phi_{L2} = \frac{V_{out} \cdot T_s}{N_s + 2 \cdot N_{La}} \left(\frac{1}{2} - D + \frac{N_s + 2 \cdot N_{La}}{2 \cdot N_s} \frac{R_F}{R_L + R_F}\right).$$

The DC fluxes in all legs of the structure are equal and expressed by $$\Phi_{T1,T2,L1,L2,DC} = \frac{L_{fa}}{N_s + 2N_{La}} \frac{I_{out}}{2}.$$

With specified parameters as core cross section, reluctance, maximum flux density and turn numbers, this approximated flux value is used to determine the air gap length needed to avoid saturation of core.

For the proposed structure in FIG. 9b, the functionality of the rectifier circuit is as described for the previous proposed structure in FIG. 6 and illustrates in FIG. 11b with the four switch phases I, II, III and IV being emphasized. Due to the additional filtering inductances $L_{a1}$ and $L_{a2}$ ($L_{fa}>L_f$), the current ripple of both secondary windings as well as the output current ripple can be considerably reduced and the winding losses minimized.

Figure 11C:
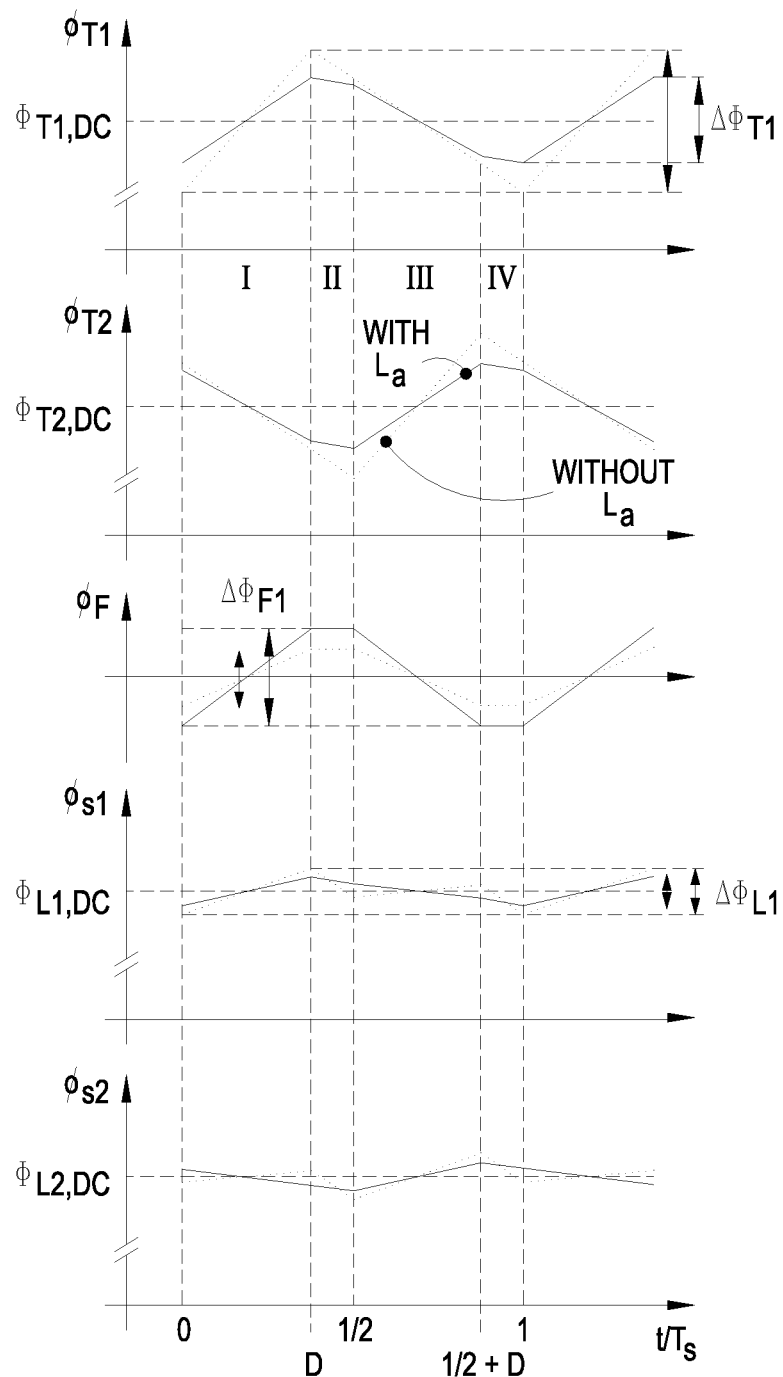
Figure 12A:
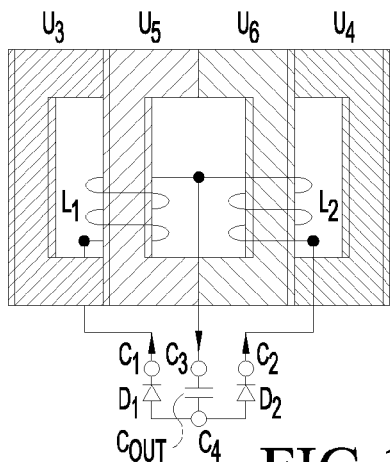
FIG. 12a, 12b, 12c, 12d, 12e, 12f structures in FIGS. 3b, 5a, 5b, 6, 9a, and 9b, respectively, with composite ferrite and powder cores and with no air gaps.
Figure 12B:
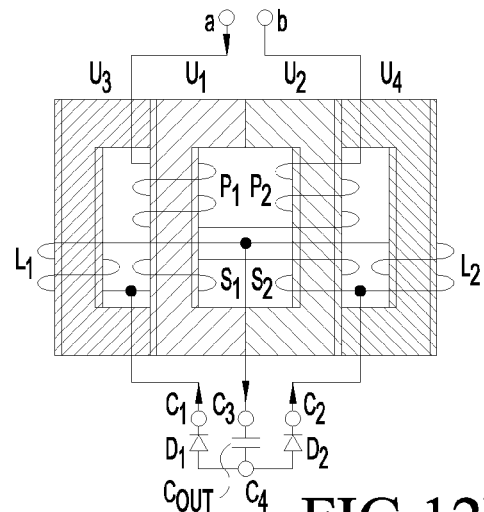
Figure 12C:
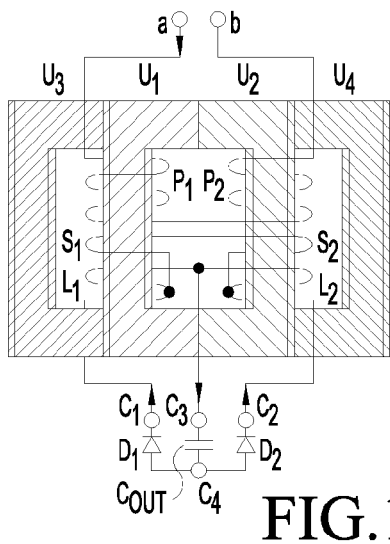
Figure 12D:
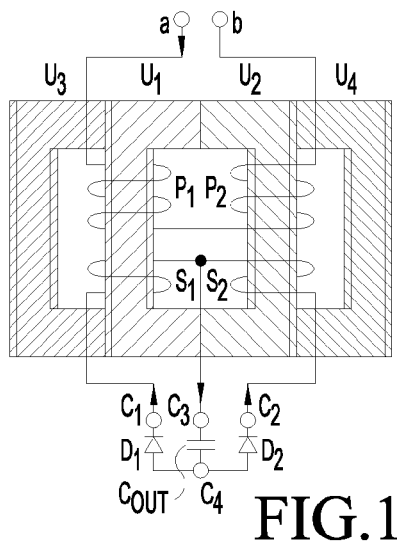
Figure 12E:
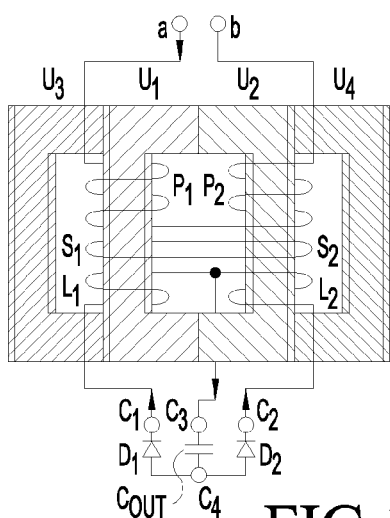
Figure 12F:
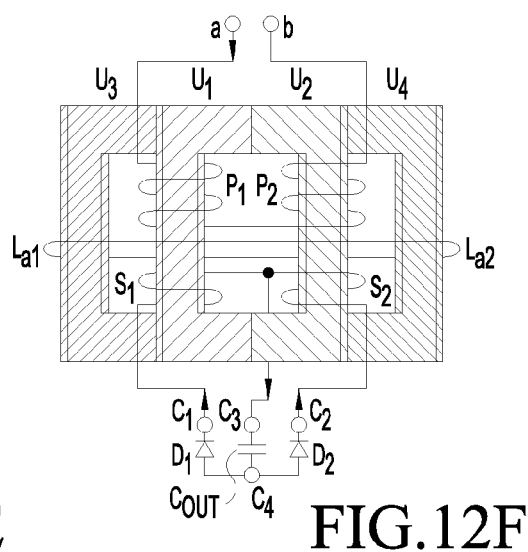
Figure 13A:
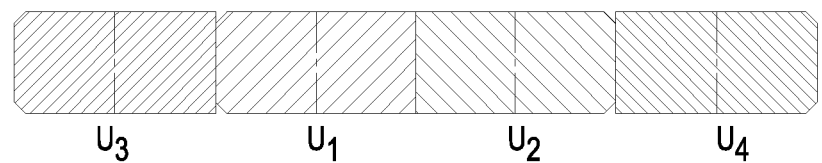
FIG. 13a, 13b, 13c, 13d, 13e alternative top views of assembly of proposed structure of integrated magnetic component in FIGS. 3a, 3b, 5a, 5b, 6, 9a, and 9b.
Figure 13B:
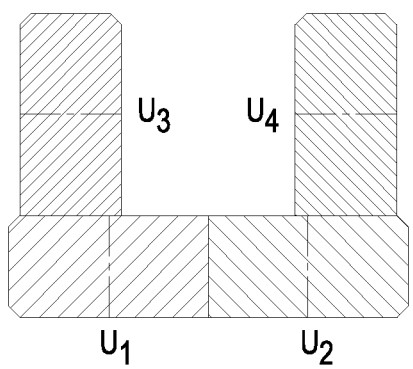
Figure 13C:
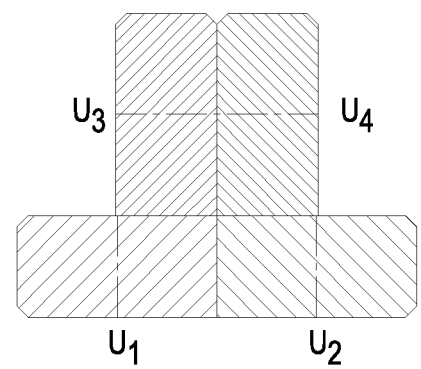
Figure 13D:
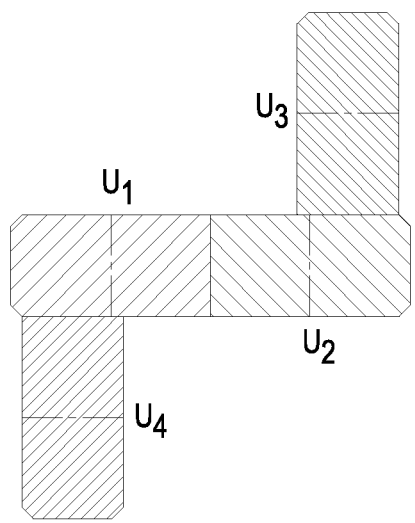
Figure 13E:
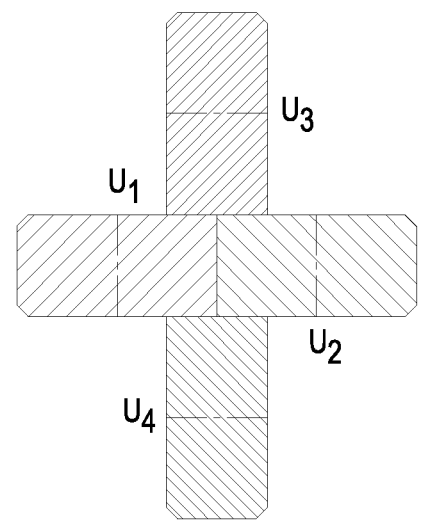

Unlike the currents waveforms, the waveforms of inner core fluxes $\phi_{T1}$ and $\phi_{T2}$ are altered. It can be noticed from FIG. 11c, that the additional filtering winding wound around the outer cores yield reduced ripple fluxes in all legs of the structure. The further minimized ripple fluxes engender reduced cores losses.

In summary the additional windings cause in one hand a drastic increase of the resulting output filtering inductance $L_{fa}$ which implies reduced ripple output current and minimized conduction and switching losses. On the other hand these windings produce a reduction of ripple fluxes which implies minimized cores losses.

Although the air gaps are distributed, their inherited fringing fields still cause winding power losses and inductance losses. Moreover, to assure mechanical stability a non permeable material is inserted at location of air gap. The mounting of this material negatively affects the bonding or gluing of the cores as well as the costs. As a solution to these hindrances, low permeability high saturation bobbins less U/UR cores are proposed to replace the outer cores, $U_3$ and $U_4$, of the numerous proposed integrated magnetic structures. The structures entirely consisted of high permeability U/UR cores with distributed air gaps as illustrated in FIGS. 3b, 5a, 5b, 6, 9a and 9b can be substituted by the respective composite core structures shown in FIGS. 12b, 12c, 12d, 12e and 12f which comprise low permeability high saturation U/UR cores and high permeability low saturation U/UR cores with no air gaps.

All previous proposed structures in this invention are juxtaposed as indicated in FIG. 13a, FIGS. 13b, 13c, 13d and 13e illustrate alternate placements of the U/UR cores without altering the functionality of the current-doubler rectifier. The alternate placements, in addition to assembly with composite core structures, further emphasize the flexibility of the bobbin less U/UR cores.

Figure 14A:
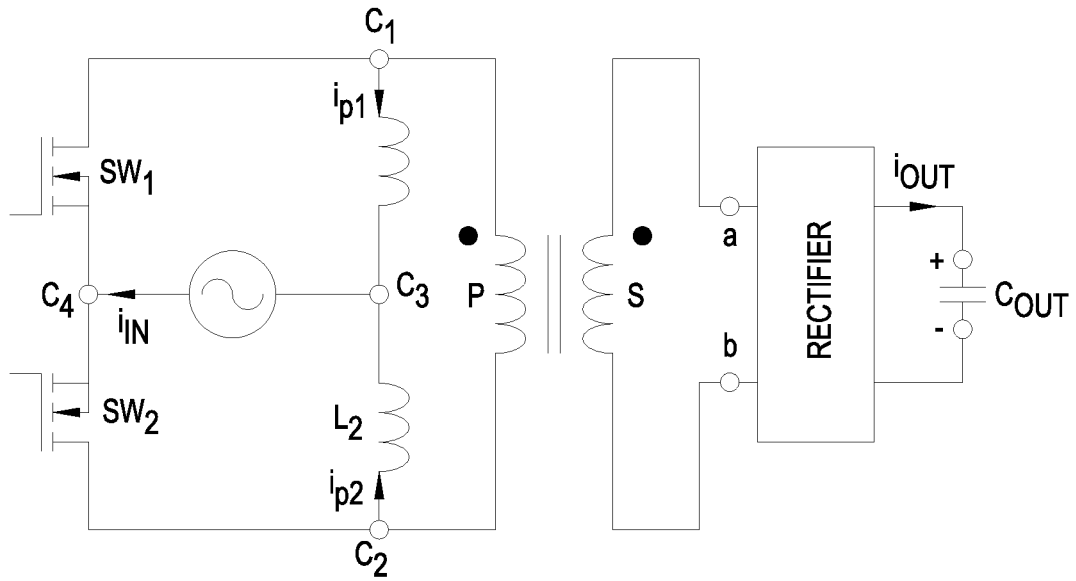
FIG. 14a, 14b the circuit configurations of the two-inductor boost converter with any rectifier and of a bidirectional converter, respectively.
Figure 14B:
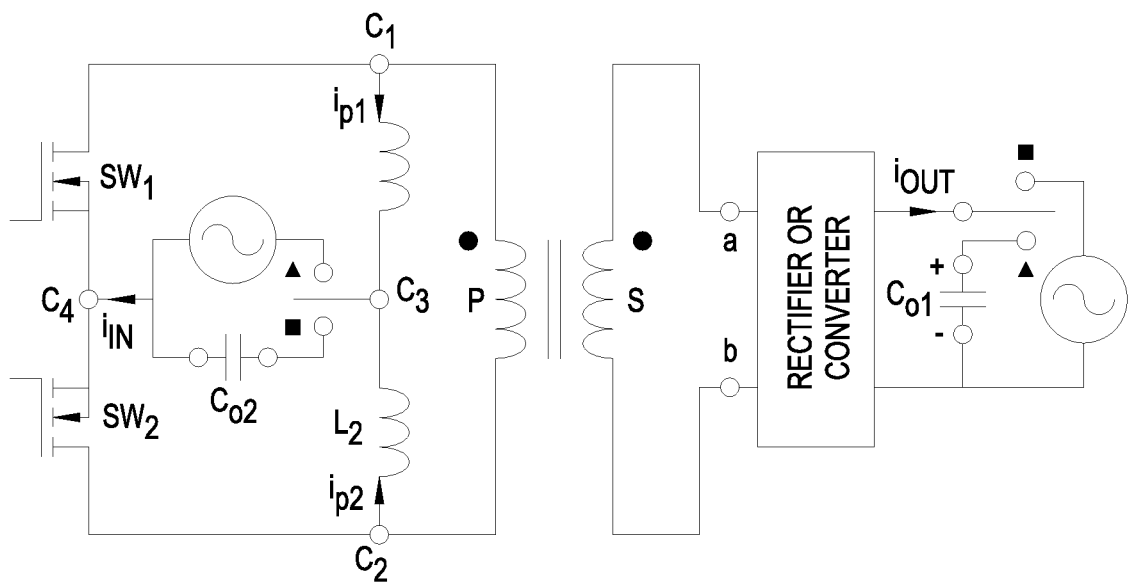

Although the coupled inductors structures are proposed for current doubler rectifier it can also be used for other topologies such as the two phased buck regulator. The integrated structures can be applied in centre tapped rectifiers also. Applying converter duality principle, the structures proposed so far for buck converters can be employed for boost converters as well. The proposed structures can be used for example in two-inductor boost converters as shown in FIG. 14a and in bidirectional converters with buck mode in one direction and boost mode in other direction as shown in FIG. 14b.

Integrated Magnetic Component for LLC Converters

Figure 15A:
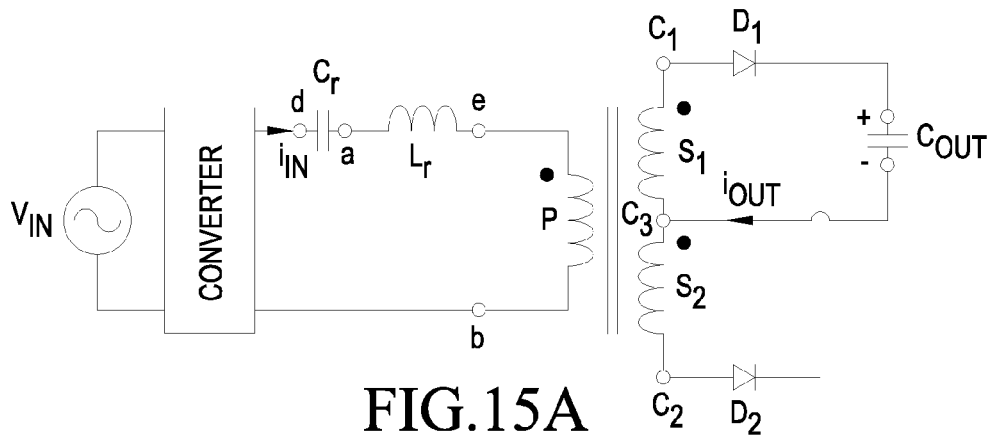
FIG. 15a, 15b the circuit configuration of LC series resonant converter and LLC series parallel resonant converter with centre tapped rectifier, respectively.
Figure 15B:
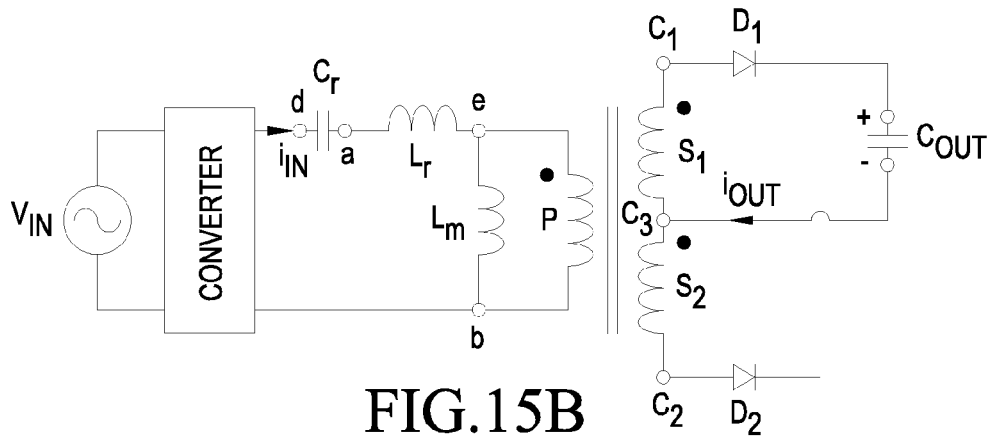

Other integrated magnetic structures proposed in the present invention are implemented in the circuit configuration shown in FIG. 15b, a LLC series parallel resonant converter, which can be used with different rectifiers. The LLC resonant converter circuit comprises one series resonant inductor $L_r$, one parallel resonant inductor $L_m$ and depending on the chosen rectifier a two- or three-winding transformer. Most of the proposed integrated magnetic structures also apply for the LC series resonant converter, shown in FIG. 15a, by just removing the air gaps in the transformer flux path, just taking out the parallel inductor $L_m$. In FIGS. 15a and 15b the primary winding of transformer is P while the secondary windings are $S_1$ and $S_2$.

Figure 16:
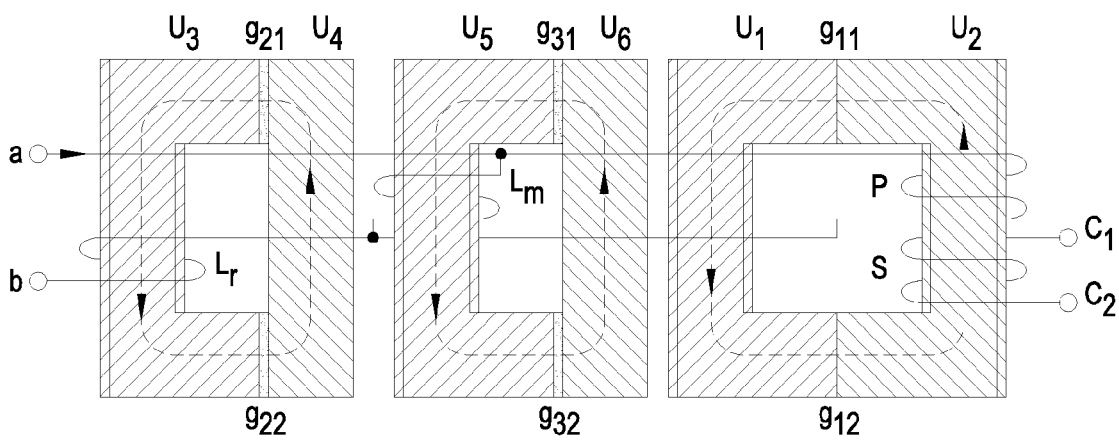
FIG. 16 the structure of discrete magnetic components for the LLC series parallel resonant converter.

FIG. 16 illustrates the configuration of discrete magnetic components for LLC series parallel resonant converter using bobbin less U/UR cores. The discrete components are a series inductor, a parallel inductor and for simplicity's sake a two-winding transformer.

Figure 17A:
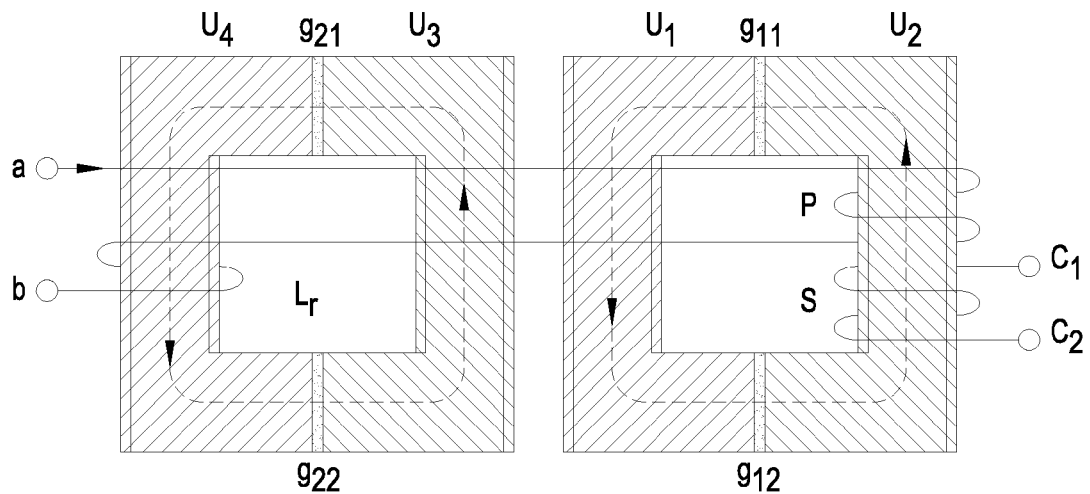
FIG. 17a, 17b, 17c three aspects of the structure of magnetic components for LLC resonant converter with parallel inductor and the transformer integrated, respectively.
Figure 17B:
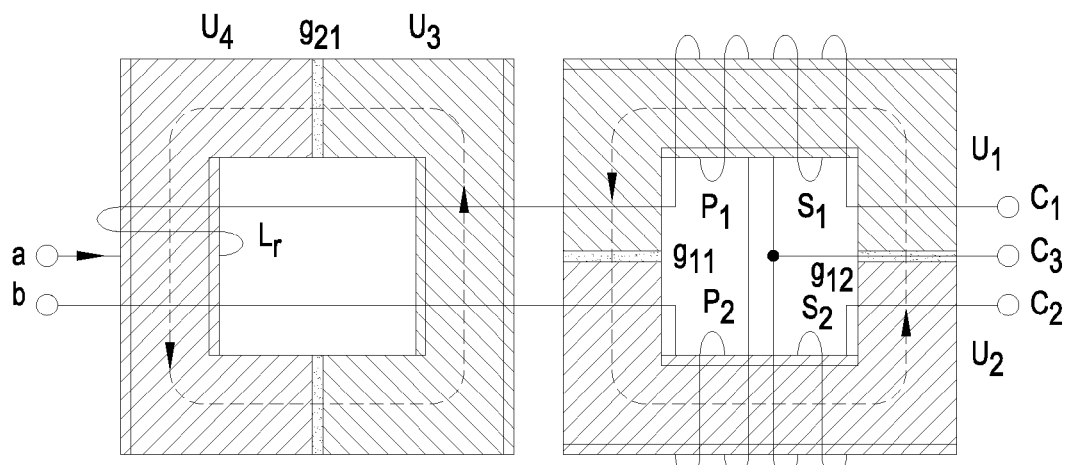
Figure 17C:
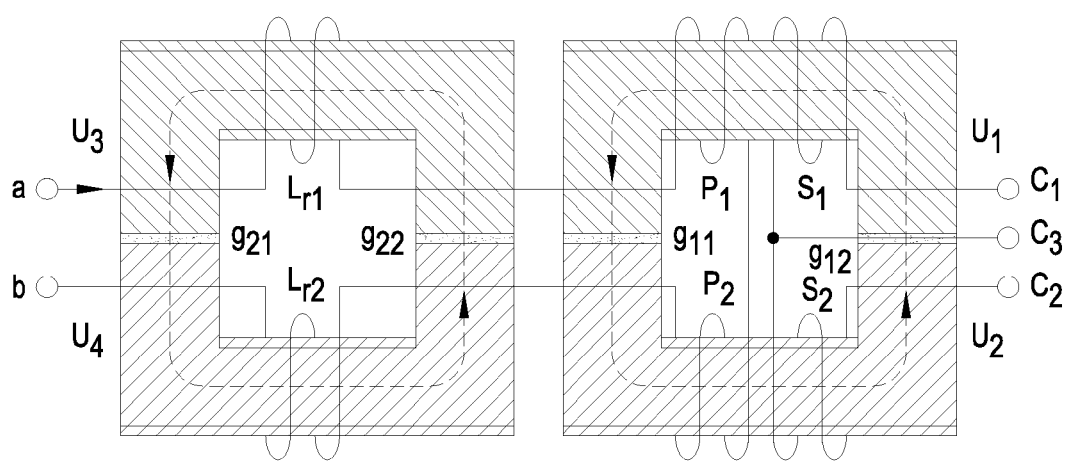

To improve the discrete components structure in the first step, the parallel resonant inductor and transformer are integrated by introducing an air gap the flux path of the ideal transformer with high permeability U/UR cores, which reduces the number of magnetic components to two. The parallel inductance is adjustable through the air gap while the turn ratio is unchanged. FIGS. 17a, 17b and 17c show three aspects of the proposed structure.

Figure 18A:
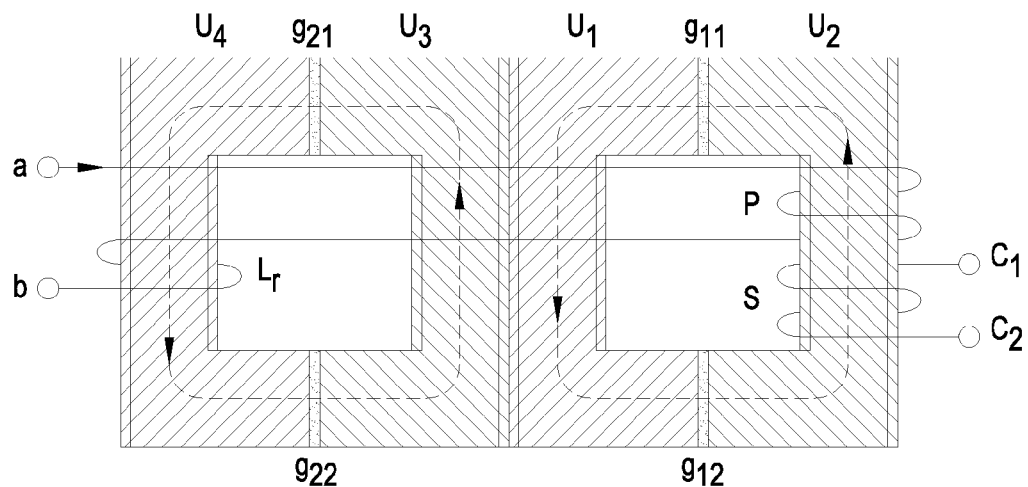
FIG. 18a, 18b two aspects of the first proposed structure of integrated magnetic components for series parallel LLC resonant converter.
Figure 18B:
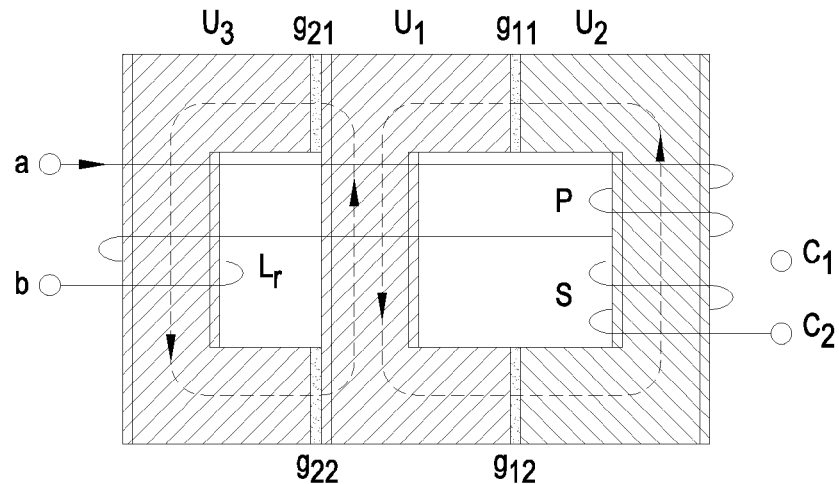
Figure 18C:
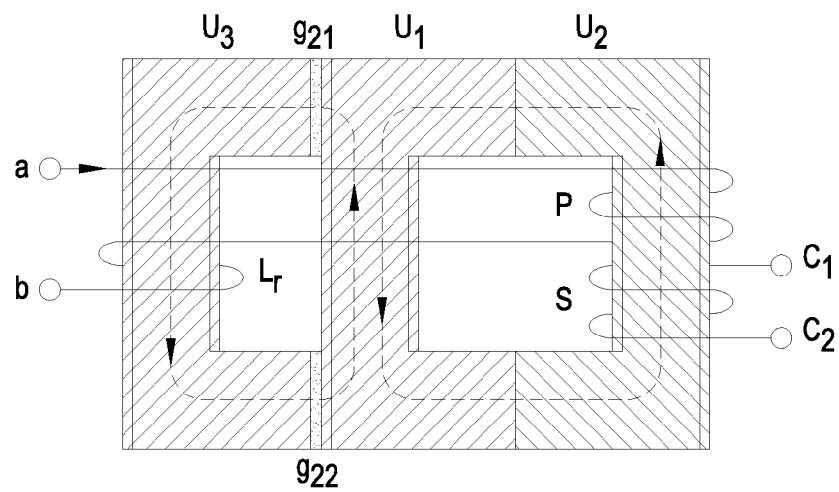
FIG. 18c the first proposed structure of integrated magnetic components for the series LC resonant converter with ferrite cores and distributed air gaps.

To reduce core losses the cores of the parallel inductor and of the gapped transformer are put together in a way that the flux in the common centre leg is cancelled. Aspects of the first proposed structure for the integration of both inductors and the transformer are shown in FIGS. 18a and 18b. FIG. 18a illustrates the aspect of proposed structure with four bobbin less U/UR cores whereby two build the centre leg. Since there is flux cancellation in the centre leg, one of centre leg U/UR cores is removed as shown in FIG. 18b. FIG. 18c shows an aspect of the proposed structure for LC series resonant converter in which the transformer is not gapped.

Figure 19A:
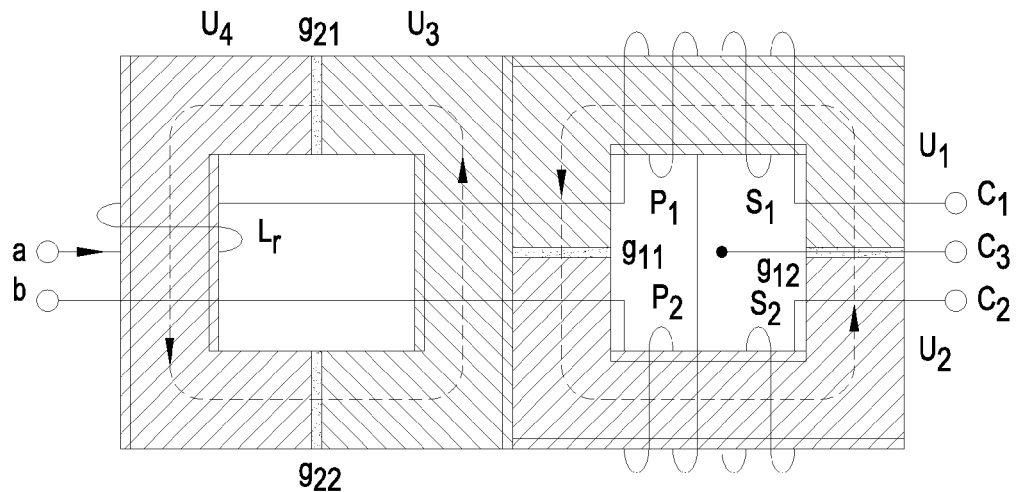
FIG. 19a, 19b, 19c the second proposed structure of integrated magnetic components for series parallel LLC resonant converter and for the series LC resonant converter with ferrite cores and distributed air gaps, respectively.
Figure 19B:
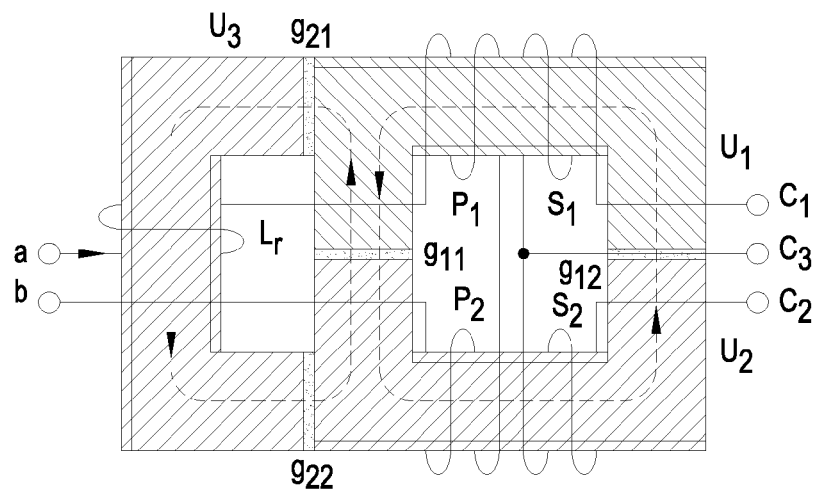
Figure 19C:
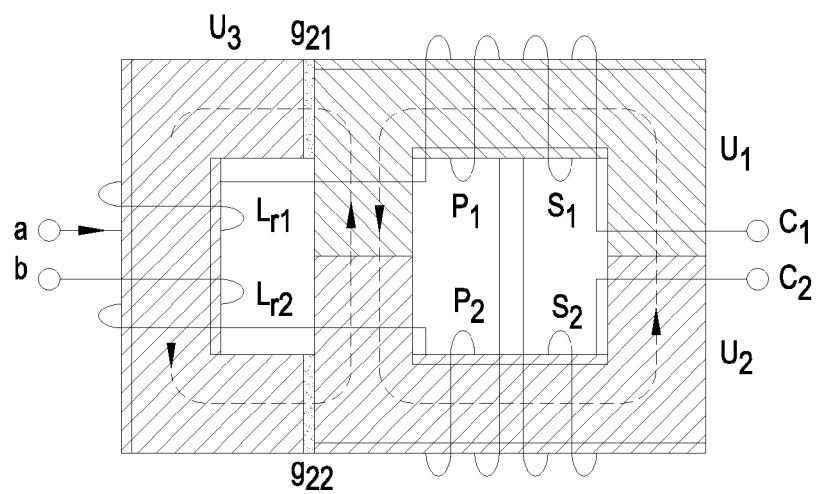

Although the cores are integrated in the former proposed structure, the inductor and the gapped transformer are still decoupled and their air gaps are designed separately one from another. To couple the resonant inductor and the transformer their cores are positioned so that an air gap is introduced in the centre leg, just increasing its reluctance and further reducing the flux. Aspects of this second proposed structure for the integration of both inductors and the transformer are revealed in FIGS. 19a and 19b, for a two- and a three-winding transformer, respectively. FIG. 19c shows an aspect of the proposed structure for LC series resonant converter in which the transformer is not gapped.

Figure 20:
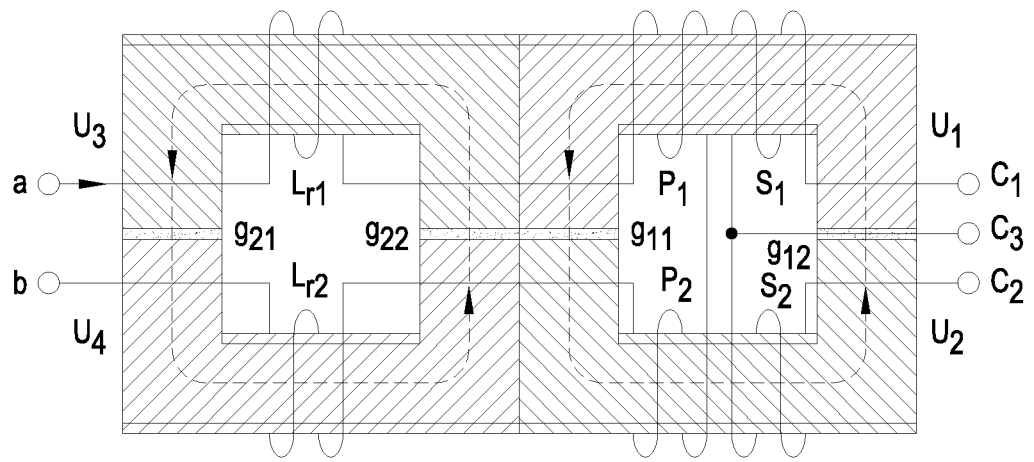
FIG. 20 the third proposed structure of integrated magnetic components for series parallel LLC resonant converter.

FIG. 20 illustrates a third proposed structure of integrated magnetic components for series parallel LLC resonant converter. It has four bobbing less U/UR cores, whereby a first set with two U/UR cores $U_1$, $U_3$ is positioned so that an air gap is aligned with an air gap of a second set with two U/UR cores $U_2$, $U_4$. However, the first and second set with two U/UR cores may be arranged without air gap. The resonant inductor is wound on the second set with two U/UR cores, whereby the transformer is wound on the first set with two U/UR cores.

Figure 21A:
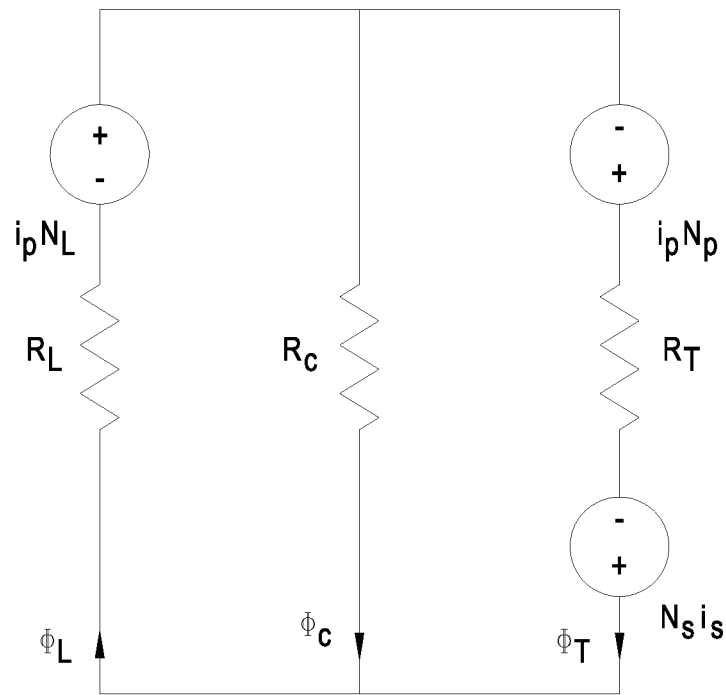
FIG. 21a, 21b the reluctance models of the first and second proposed structures, respectively.
Figure 21B:
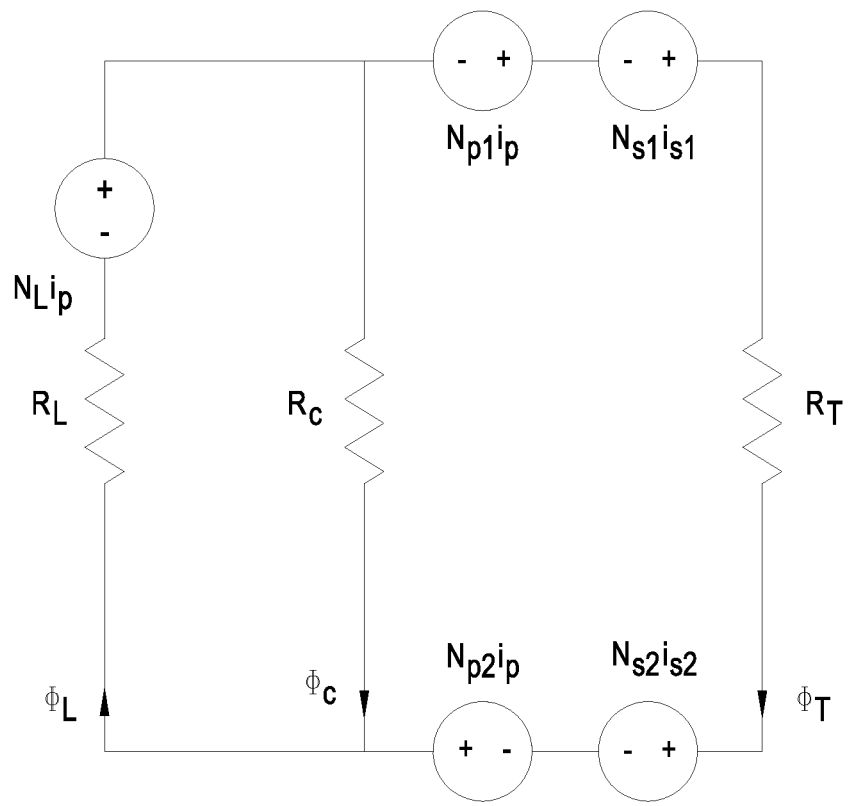

The corresponding reluctance models of both proposed structures of resonant converters for the integration of both inductors and the transformer are shown in FIGS. 21a and 21b, which are analogous. $R_L$ represents the reluctance of inductance core with its respective distributed air gaps, $R_T$ represents the reluctance of transformer core with its respective air gaps and $R_c$ represents the reluctance of centre leg with its respective air gap.

For simplicity the reluctance model with a two winding transformer shown in FIG. 21a will be analyzed hereafter. After mathematical description of the reluctance model and application of Faraday's Law on all windings, some equations manipulation yield the inductance matrix of the integrated component which is calculated to be $$L = \begin{pmatrix} L_{11} & M_{12} \\ M_{12} & L_{22} \end{pmatrix}$$

$$= \begin{pmatrix} \dfrac{(R_L + R_c) \cdot N_p^2 + 2R_c \cdot N_p N_L + (R_T + R_c) \cdot N_L^2}{R_T \cdot (R_L + R_c) + R_L \cdot R_c} & \dfrac{(R_c \cdot N_L + (R_L + R_c) \cdot N_p) \cdot N_s}{R_T \cdot (R_L + R_c) + R_L \cdot R_c} \\ \dfrac{(R_c \cdot N_L + (R_L + R_c) \cdot N_p) \cdot N_s}{R_T \cdot (R_L + R_c) + R_L \cdot R_c} & \dfrac{(R_L + R_c) \cdot N_s^2}{R_T \cdot (R_L + R_c) + R_L \cdot R_c} \end{pmatrix}.$$

Using calculated elements of the inductance matrix, primary $L_{11}$, secondary self inductances $L_{22}$ and the mutual inductance $M_{12}$, parameters of transformer $\pi$ model, the primary leakage inductance $L_r$, the magnetizing inductance $L_m$ and the equivalent primary turn number $N_{pn}$ are respectively described as $$L_r = L_{11} - \dfrac{M_{12}^2}{L_{22}} = \dfrac{N_L^2}{R_L + R_c},$$

$$L_m = L_{11} - L_r = \dfrac{R_L + R_c}{R_T \cdot (R_L + R_c) + R_L \cdot R_c} N_{pn}^2 = \dfrac{N_{pn}^2}{R_T + R_L // R_c}$$

and $$N_{pn} = N_s \dfrac{L_m}{M_{12}} = N_p + \dfrac{R_c}{R_L + R_c} N_L.$$

For high permeability low saturation flux density material with no air gap in the centre core, just $R_c \ll R_L, R_T$, the gapped transformer and resonant inductor are decoupled and the primary leakage inductance $L_r$, the magnetizing inductance $L_m$ and the equivalent primary turn number $N_{pn}$ are simplified to be:

$$L_r \approx \dfrac{N_L^2}{R_L}, \quad L_m \approx \dfrac{N_{pn}^2}{R_T} \text{ and } N_{pn} \approx N_p.$$

The ac flux ripples in the transformer core $\Delta\Phi_T$ and in the inductor core $\Delta\Phi_L$ are respectively expressed by:

$$\Delta\Phi_T = \dfrac{1}{4} \dfrac{V_{out} \cdot T_s}{N_s} \text{ and}$$

-continued $$\Delta\Phi_L = \frac{L_r}{N_L} \cdot \left(\left(\frac{N_s}{N_p}\frac{\pi \cdot I_{out}}{2}\right)^2 + \left(\frac{N_p}{N_s}\frac{V_{out} \cdot T_s}{4L_m}\right)^2\right)^{1/2},$$

where $V_{out}$ and $I_{out}$ are output voltage and output current.

With given parameters such as maximum flux density and turn numbers, these ripple flux values are used to determine the cross section of the transformer and inductor U/UR core needed to avoid saturation.

Figure 22A:
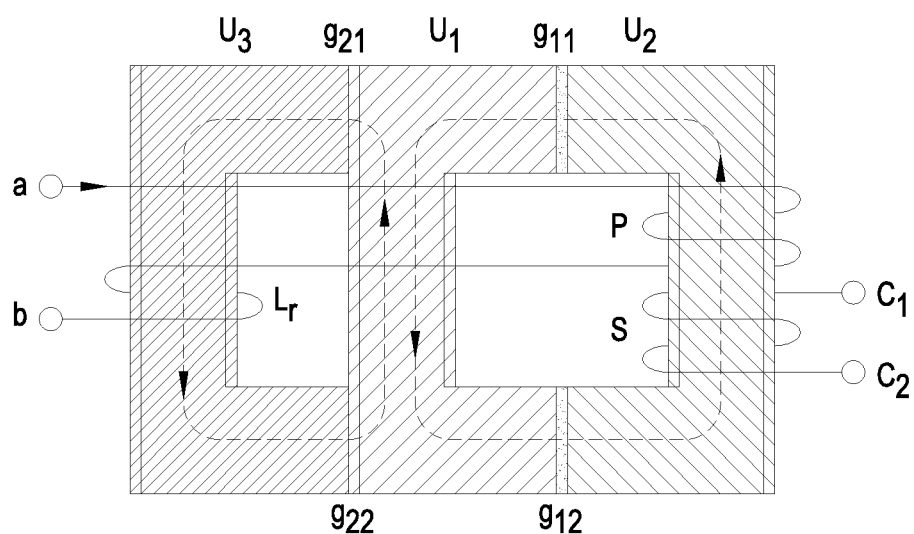
FIG. 22a, 22b, 22c different configurations of the first proposed structure of integrated magnetic component either with composite ferrite and iron powder cores or completely with iron powder cores.
Figure 22B:
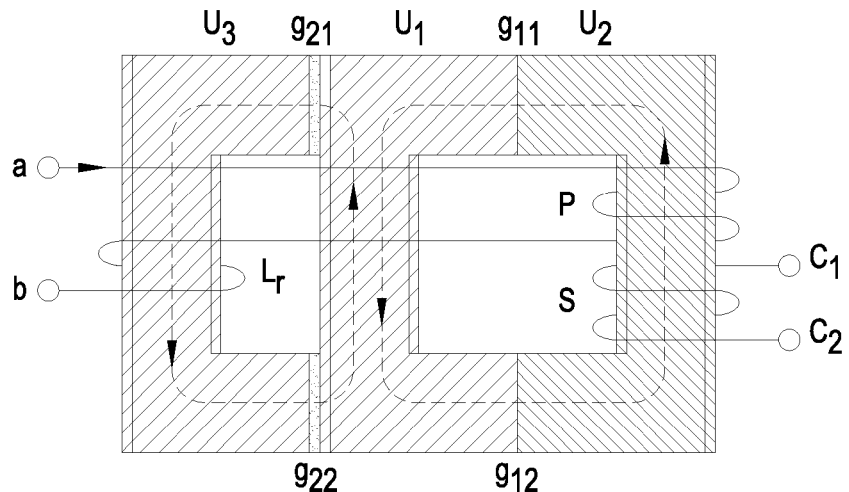
Figure 22C:
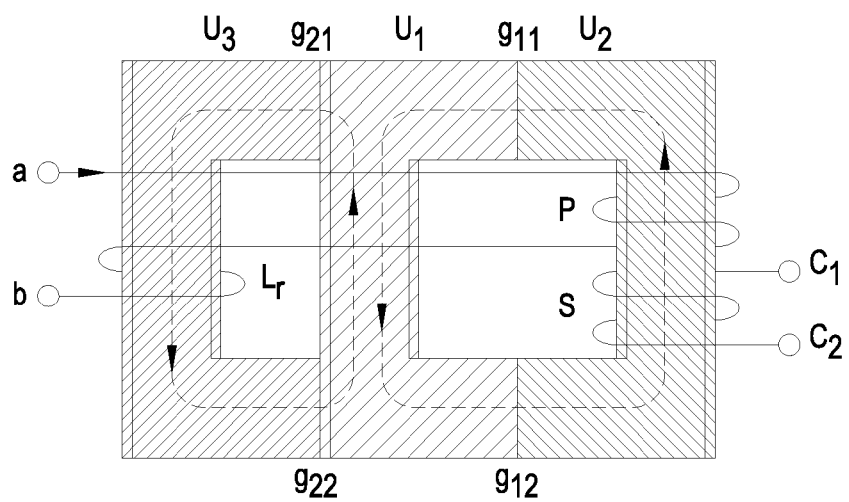
Figure 23A:
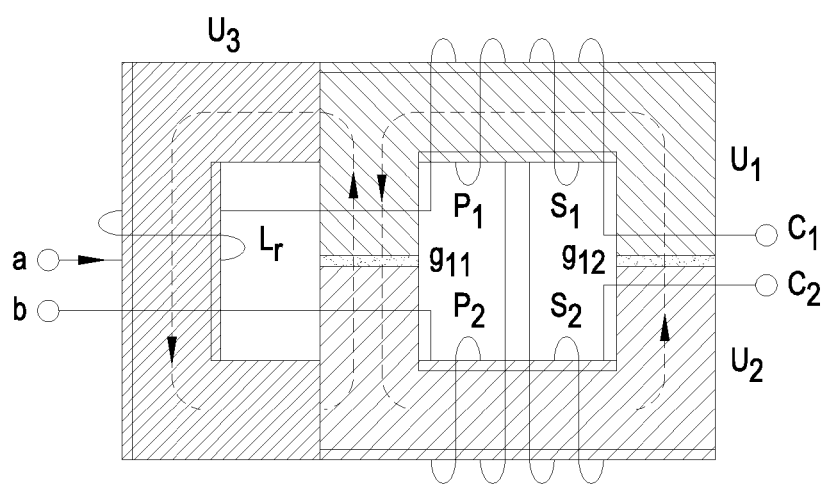
FIG. 23a, 23b, 23c different configurations of the second proposed structure of integrated magnetic component either with composite ferrite and iron powder cores or completely with iron powder cores.
Figure 23B:
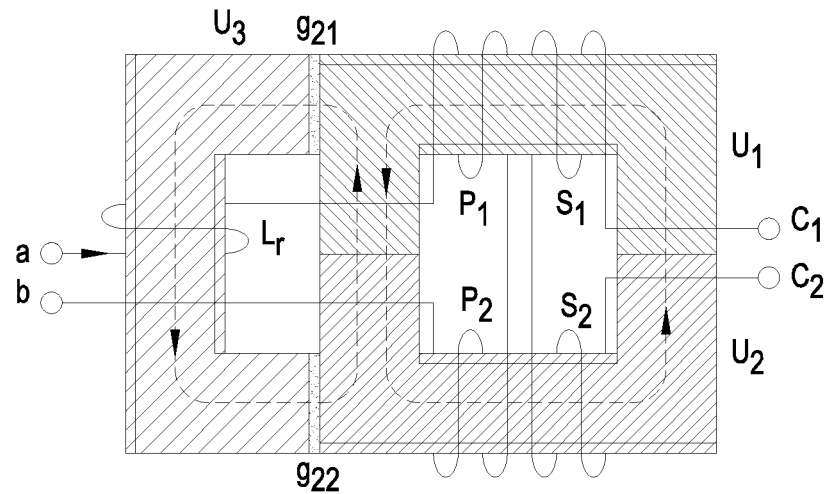
Figure 23C:
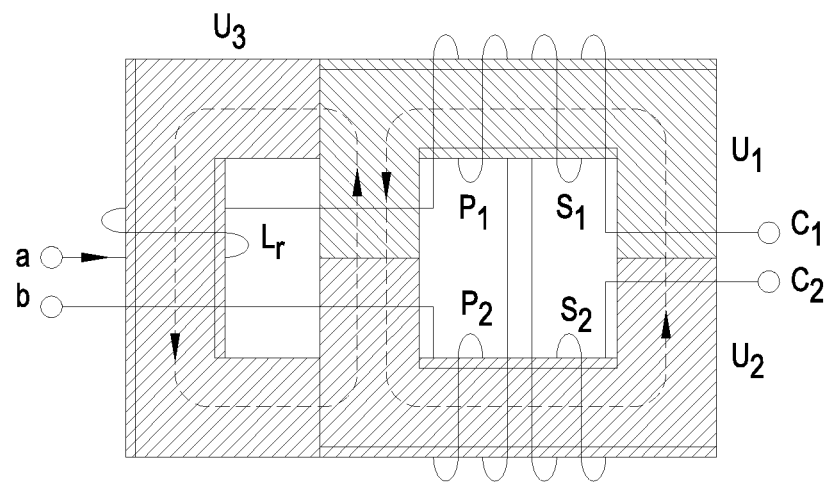
Figure 24:
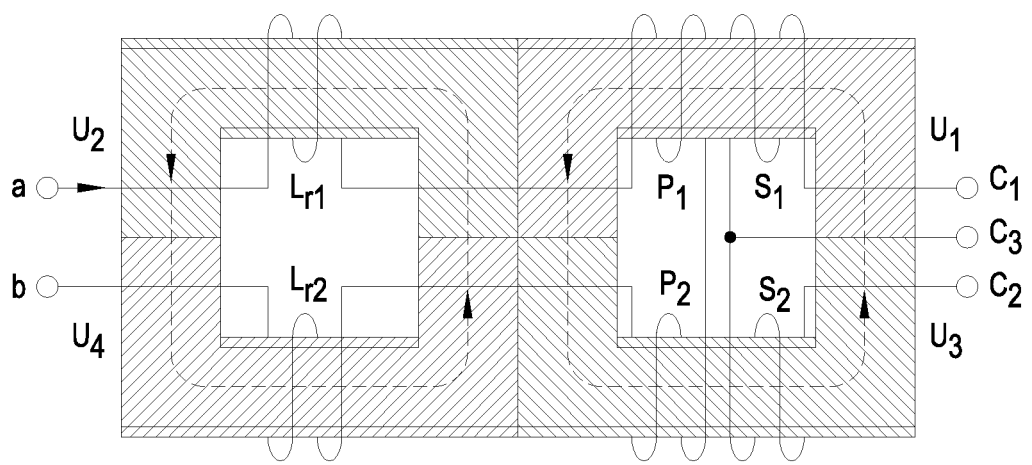
FIG. 24 the third proposed structure of integrated magnetic component completely with iron powder cores.

Although the air gaps are on occasion distributed, their inherited fringing fields still cause winding power losses and inductance losses. Moreover, to assure mechanical stability a non permeable material is inserted at location of air gap. The mounting of this material negatively affects the bonding or gluing of the cores as well as the costs. As a solution to these hindrances, low permeability high saturation bobbins less U/UR cores are proposed to replace any gapped path in the proposed structures. FIGS. 22a, 22b, and 22c illustrate aspects which comprise either composite low permeability high saturation U/UR cores and high permeability low saturation U/UR cores or entirely low permeability high saturation U/UR cores for the first proposed structure of integrated inductors and transformer. FIGS. 23a, 23b, and 23c illustrate aspects which comprise either composite low permeability high saturation U/UR cores and high permeability low saturation U/UR cores or entirely low permeability high saturation U cores for the second proposed structure of integrated inductors and transformer. FIG. 24 illustrates the third proposed structure of integrated magnetic component completely with iron powder cores.

Figure 25A:
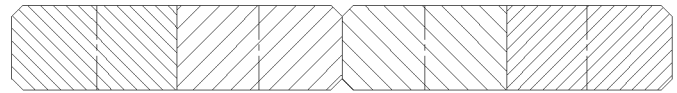
FIG. 25a, 25b, 25c alternative top views of assembly for first aspect of the first proposed structure of integrated magnetic components.
Figure 25B:
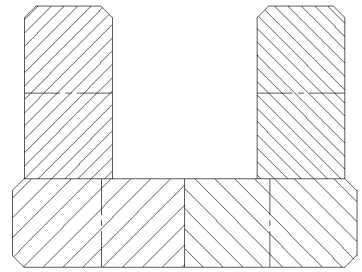
Figure 25C:
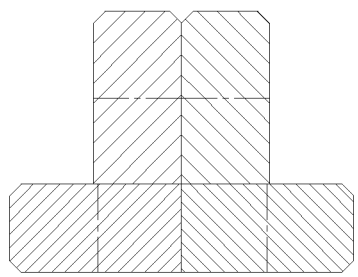
Figure 26A:
FIG. 26a, 26b, 26c alternative top views of assembly for second aspect of the first proposed structure of integrated magnetic components.
Figure 26B:
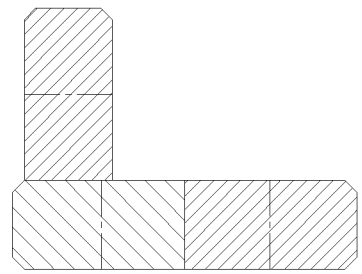
Figure 26C:
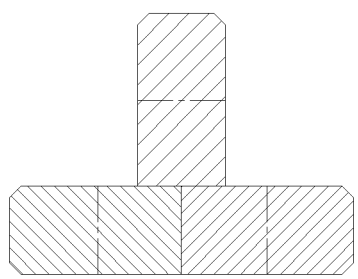
Figure 27A:
FIG. 27a, 27b alternative top views of assembly for the second proposed structure of integrated magnetic components.
Figure 27B:
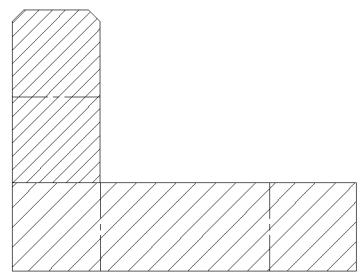

All previous proposed structures in this invention are formed of juxtaposed U/UR cores. FIGS. 25a, 25b and 25c illustrate alternate placements of the U/UR cores without altering the functionality of the first aspect of the first proposed structure with four U/UR cores. FIGS. 26a, 26b and 26c illustrate alternate placements of the U/UR cores without altering the functionality of the second aspect of the first proposed structure with three U/UR cores. FIGS. 27a and 27b illustrate alternate placements of the U/UR cores without altering the functionality of the second proposed structure with three U/UR cores. The alternate placements, in addition to assembly with composite core structures, further emphasize the flexibility of the bobbin less U/UR cores.

Figure 28A:
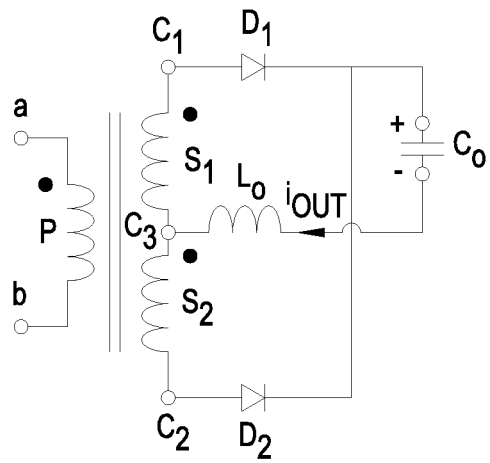
FIG. 28a, 28b circuit configurations of the centre tapped rectifier and push pull converter, respectively.
Figure 28B:
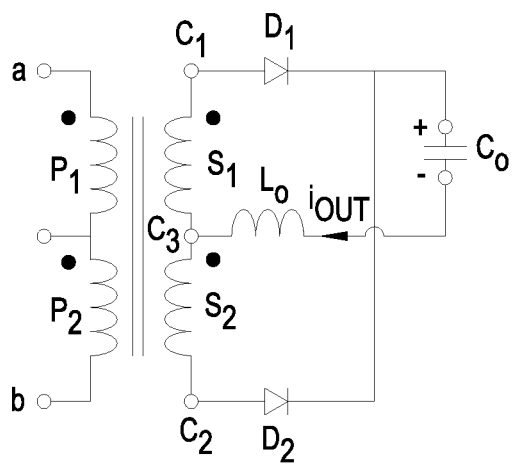

Although the proposed integrated magnetic structures are demonstrated for LC series and series parallel LLC resonant converters they can be employed in various circuits such as the centre rectifier or the push pull converter shown in FIGS. 28a and 28b, respectively.

In summary, it is to be noted that the magnetic converter circuit and compact structure made of bobbin less U/UR cores improves the power density, reduces the costs, lowers the losses and improves the efficiency as well as the thermal resistance since there is no bobbin needed and the air gaps are distributed.

The invention claimed is:

1. An integrated magnetic component, comprising:
   a first, a second and a third U core or UR core,
   wherein each core has a first post and a second post with free ends on one side and a leg connecting the first post and the second post on their other side,
   wherein the first and the second core are assembled with their free ends abutting each other to form a first O-shaped core assembly, and the free ends of the third core are abutting the outside of the first O-shaped core assembly on one side,
   wherein at least one of the first, second, or third cores is a pre-manufactured standardized building block, the core of each pre-manufactured standardized building block is bobbin less and includes a winding wound directly on its leg such that each turn of said winding encompasses just said leg; and
   a fourth U core or UR core having a first post and a second post with free ends on one side and a leg connecting the first post and the second post on their other side, wherein the free ends of the fourth U core or UR core are abutting the outside of the first O-shaped core assembly on a side opposite to the third core.

2. The integrated magnetic component according to claim 1, further comprising one or more air gaps, wherein an air gap is arranged either
   between the first core and the second core,
   between the third core and the first O-shaped core assembly
   or between the fourth core and the first O-shaped core assembly.

3. The integrated magnetic component according to claim 2, characterized in that a non permeable material is inserted at the location of one or more air gaps.

4. The integrated magnetic component according to claim 1, characterized in that all cores are arranged in a plane.

5. The magnetic component according to claim 1, characterized in that the first O-shaped core assembly is arranged in a plane and that at least one of the third and the fourth cores are arranged orthogonal to that plane, wherein the third core and the fourth core are arranged either on the same side of the plane or on opposite sides of the plane.

6. The integrated magnetic component according to claim 1, characterized in that the cores comprise a low reluctance, high permeability, low saturation flux density core material with air gaps or a high reluctance, low permeability, high saturation flux density core material without air gaps.

7. The integrated magnetic component according to claim 1, characterized in that the axis of the legs of the cores are arranged essentially in parallel directions or that the axis of the legs of the first core and the second core are arranged essentially in orthogonal direction to the axis of the legs of the third core and the fourth core.

8. The integrated magnetic component according to claim 1, further comprising:
   a) a fifth and a sixth U core or UR core assembled to form a second O-shaped core assembly, wherein the first O-shaped core assembly is in a moved out position from the location abutting the third and the fourth core and replaced by the second O-shaped core assembly abutting the third and fourth core,
   b) a first and a second primary winding are wound directly on the first and the second core respectively, wherein one end of the first and one end of the second primary winding are connected together, wherein the other end of the first respectively the second primary winding is connected to a first respectively a second primary connection point,
   c) a first and a second secondary winding are wound directly on the first and the second core, wherein one end of the first and one end of the second secondary winding are connected together, and
   d) a third secondary winding is wound directly on the fifth core on the third core or on the fifth core and the third core and a fourth secondary winding is wound directly on the sixth core or the fourth core or on the sixth core and the fourth core, wherein one end of the third and one end of the fourth secondary winding and a third secondary connection point are connected together, wherein the other ends of the third respectively the fourth secondary winding are connected to the other ends of the first respectively the second secondary winding and to a first respectively to a second secondary connection point.

9. The integrated magnetic component according to claim 1, characterized in that:
   a) a first and a second primary winding are wound directly on the first and the second core, wherein one end of the first and one end of the second primary winding are connected together, wherein the other end of the first respectively the second primary winding is connected to a first respectively a second primary connection point,
   b) a first and a second secondary winding are wound directly on the first and the second core, wherein one end of the first and one end of the second secondary winding are connected together,
   c) a third secondary winding is wound directly on the first core on the third core or on the first core and on the third core, and a fourth secondary winding is wound directly on the second core or on the fourth core or on the second core and on the fourth core, wherein one end of the third and one end of the fourth secondary winding and a third secondary connection point are connected together, wherein the other ends of the third respectively the fourth secondary winding are connected to the other ends of the first respectively the second secondary winding and to a first respectively to a second secondary connection point.

10. The integrated magnetic component according to claim 1, characterized in that:
    a) a first and a second primary winding are wound directly on the first and the second core, wherein one end of the first and one end of the second primary winding are connected together, wherein the other end of the first respectively the second primary winding is connected to a first respectively a second primary connection point, and
    b) a first and a second secondary winding are wound directly on the first and the second core, wherein one end of the first and one end of the second secondary winding and a third secondary connection point are connected together, wherein the other end of the first respectively the second secondary winding is connected to a first respectively to a second secondary connection point.

11. The integrated magnetic component according to claim 1, characterized in that:
    a) a first and a second primary winding are wound directly on the first and the second core, wherein one end of the first and one end of the second primary winding are connected together, wherein the other end of the first respectively the second primary winding is connected to a first respectively a second primary connection point,
    b) a first and a second secondary winding are wound directly on the first and the second core,
    c) a third and a fourth secondary winding are wound directly on the first, the second, the third, and/or the fourth core, wherein one end of the third and one end of the fourth secondary winding are connected together, wherein:
    d) one end of the first and the second secondary winding and the other end of the third secondary winding are connected together, and the other end of the fourth secondary winding is connected to a third secondary connection point,
    e) the other end of the first respectively the second secondary winding is connected to a first respectively to a second secondary connection point.

12. The integrated magnetic component according to claim 8, comprising a first and a second primary connection point and a first, a second, and a third secondary connection point, characterized in that
    a) the first and the second primary connection point are connected to a voltage source,
    b) the first secondary connection point is connected to one end of a first rectifier,
    c) the second secondary connection point is connected to one end of a second rectifier,
    d) the third secondary connection point is connected to one end of a capacitor, and
    e) the other ends of the first rectifier, the second rectifier and the capacitor are connected together.

13. The integrated magnetic component according to claim 1, characterized in that one or more air gaps are arranged:
    between the first core and the second core,
    or between the third core respectively the fourth core and the first O-shaped core assembly.

14. An integrated magnetic component, comprising: a first, a second, a third and a fourth U core or UR core wherein each core has a first post and a second post with free ends on one side and a leg connecting the first post and the second post on their other side,
    wherein the first and the second core are assembled with their free ends abutting each other to form a first O-shaped core assembly, the leg of the third core is abutting the outside of the first O-shaped core assembly, and the ends of the fourth core are abutting the ends of the third core
    wherein at least one of the first, second, third or fourth cores is a pre-manufactured standardized building block, where the core of each pre-manufactured standardized building block is bobbin less and includes a winding wound directly on its leg such that each turn of said winding encompasses just said leg.

15. The integrated magnetic component according to claim 14, characterized in that:
    a) a first primary winding is wound directly on the second core, wherein one end of the first primary winding is connected to a first primary connection point,
    b) a third primary winding is wound directly on the third respectively the fourth core, wherein one end of the third primary winding is connected to a second primary connection point, wherein the other ends of the first and the third primary winding are connected together, and
    c) a first secondary winding is wound directly on the second core, wherein one end of the first secondary winding is connected to a first secondary connection point and the other end of the winding is connected to a second secondary connection point.

16. The integrated magnetic component according to claim 14, characterized in that:
    a) a first primary winding is wound directly on the first core and a second primary winding is wound directly on the second core, wherein one end of the first and one end of the second primary winding are connected together,
    b) a third primary winding is wound directly on the third core or a fourth primary winding is wound directly on the third core or a third and a fourth primary winding are wound directly on the third core, wherein one end of the third respectively one end of the fourth primary winding is connected to a first respectively to a second primary connection point, wherein the other end of the first and the other end of the second primary winding is connected to the other end of the third primary winding respectively to the first primary connection point and to the other end of the fourth primary winding respectively to the second primary connection point, c) a first secondary winding is wound directly on the first core and a second secondary winding is wound directly on the second core, wherein one end of the first secondary winding is connected to a first secondary connection point, wherein one end of the second secondary winding is connected to a second secondary connection point, wherein the other ends of the first and second secondary winding are connected together and preferably to a third secondary connection point.

17. The integrated magnetic component according to claim 14, further comprising one or more air gaps, where an air gap is arranged either between the third core and the first O-shaped core assembly or between the fourth core and the first O-shaped core assembly.

18. The integrated magnetic component according to claim 14, characterized in that the first O-shaped core assembly is arranged in a plane and that at least one of the third and the fourth cores are arranged orthogonal to that plane, wherein the third core and the fourth core are arranged either on the same side of the plane or on opposite sides of the plane.

19. The integrated magnetic component according to claim 14, characterized in that the cores comprise a low reluctance, high permeability, low saturation flux density core material with air gaps or a high reluctance, low permeability, high saturation flux density core material without air gaps.

20. The integrated magnetic component according to claim 14, characterized in that the axis of the legs of the cores are arranged essentially in parallel directions or that the axis of the legs of the first core and the second core are arranged essentially in orthogonal direction to the axis of the legs of the third core and the fourth core.

21. A method for assembling an integrated magnetic component, with the steps:

a) providing a first, a second, a third and a fourth U core or UR core, b) winding at least one winding directly on at least one of the first, the second, the third and the fourth U core or UR core, where said at least one winding is wound only on one core such that each turn of said at least one winding encompasses just said core, c) assembling the first and the second core with their free ends abutting each other to form a O-shaped core assembly, and d) assembling the third and the fourth core abutting an outside of the O-shaped core assembly with their free ends.

22. The method according to claim 21, further comprising the step:

a) connecting one or more ends of the windings wound on the cores together or to at least one connection point.

23. A switched mode LLC resonant converter including an integrated magnetic component comprising:

a first, a second, a third and a fourth U core or UR core wherein each core has a first post and a second post with free ends on one side and a leg connecting the first post and the second post on their other side, wherein the first and the second core are assembled with their free ends abutting each other to form the first O-shaped core assembly, the leg of the third core is abutting the outside of the first O-shaped core assembly and the ends of the fourth core are abutting the ends of the third core, wherein at least one of the first, second, third or fourth cores is a pre-manufactured standardized building block, where the core of each pre-manufactured standardized building block is bobbin less and includes a winding wound directly on its leg such that each turn of said winding encompasses just said leg.

24. A switched mode full bridge or half bridge DC/DC converter including an integrated magnetic component comprising:

a first, a second, a third and a fourth U core or UR core wherein each core has a first post and a second post with free ends on one side and a leg connecting the first post and the second post on their other side, wherein the first and the second core are assembled with their free ends abutting each other to form the first O-shaped core assembly, the free ends of the third core are abutting the outside of the first O-shaped core assembly on one side and the free ends of the fourth core are abutting the outside of the first O-shaped core assembly on a side opposite to the third core, wherein at least one of the first, second or third cores is a pre-manufactured standardized building block, where the core of each pre-manufactured standardized building block is bobbin less and includes a winding wound directly on its leg such that each turn of said winding encompasses just said leg.

25. The switched mode full bridge or half bridge DC/DC converter according to claim 24, including a current doubler rectifier.

* * * * *